United States Patent [19]

Nagato et al.

[11] Patent Number: 5,402,157
[45] Date of Patent: Mar. 28, 1995

[54] ELECTROPHOTOGRAPHIC RECORDING APPARATUS

[75] Inventors: Hitoshi Nagato, Tokyo; Yuzo Koike; Shuzo Hirahara, both of Yokohama; Masafumi Mori, Tokyo, all of Japan

[73] Assignee: Kabushiki Kaisha Toshiba, Kawasaki, Japan

[21] Appl. No.: 39,999

[22] Filed: Mar. 30, 1993

[30] Foreign Application Priority Data

Mar. 30, 1992 [JP] Japan .................................. 4-072028
Aug. 31, 1992 [JP] Japan .................................. 4-230742

[51] Int. Cl.⁶ ...................... G01D 15/06; G01D 15/14
[52] U.S. Cl. ..................................... 347/122; 347/131; 347/132
[58] Field of Search ...................... 346/153.1, 159, 108, 346/160, 155

[56] References Cited

U.S. PATENT DOCUMENTS

| 4,825,230 | 4/1989 | Shimizu | 346/108 |
| 5,136,153 | 8/1992 | Komiya et al. | 346/110 R |
| 5,229,596 | 7/1993 | Ujihara | 250/208.1 |

OTHER PUBLICATIONS

A. Kaneko, et al., IEEE Transactions on Electron Devices, vol. 38, No. 10, Oct. 1991, pp. 2395–2397. "Wedge–Shaped Field Emitter Arrays for Flat Display".

A. Ghis, et al., IEEE Transactions on Electron Devices, vol. 38, No. 10, Oct. 1991, pp. 2320–2322. "Sealed Vaccum Devices: Fluorescent Microtip Displays".

*Primary Examiner*—George H. Miller, Jr.
*Attorney, Agent, or Firm*—Oblon, Spivak, McClelland, Maier & Neustadt

[57] ABSTRACT

A voltage is selectively applied between two electrodes (emitter and gate) disposed at a short distance to create an intense electric field between the electrodes. Electrons emitted by the field emission are accelerated by the intense electric field and collide against a fluorescent layer so that light can be emitted from portions of the fluorescent layer. With a recording head of the above construction, an electrostatic latent image is formed on a photosensitive drum.

20 Claims, 14 Drawing Sheets

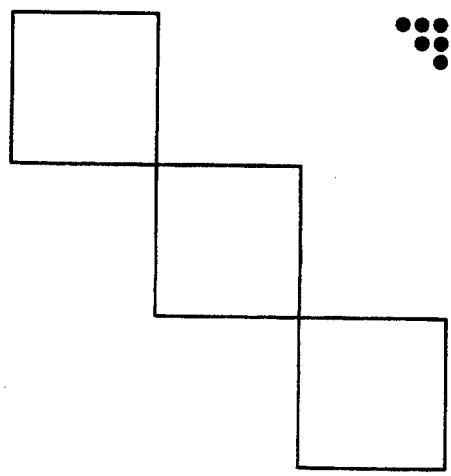
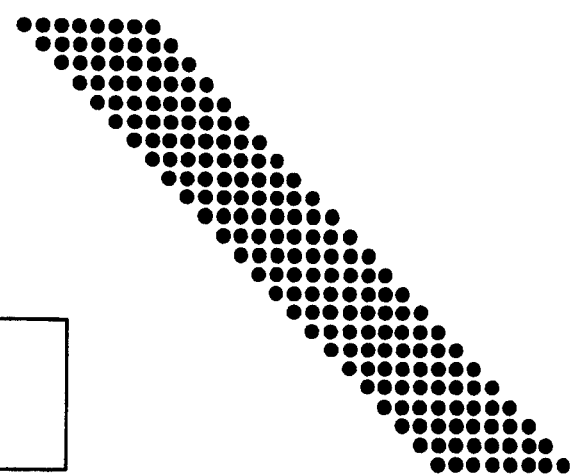
FIG. 9A  FIG. 9B
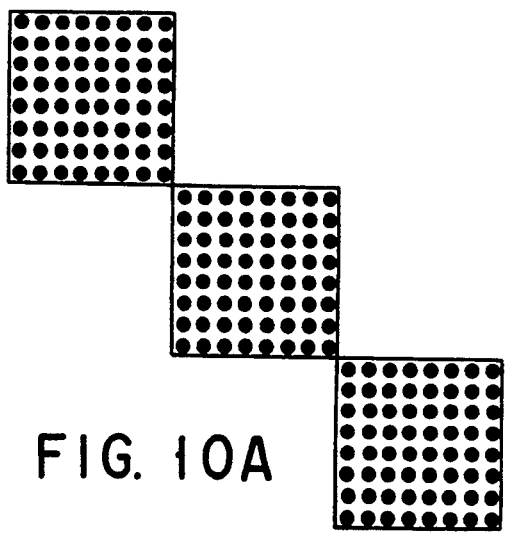
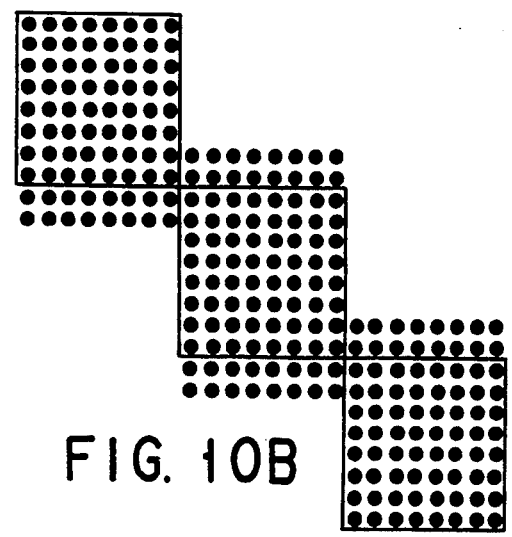
FIG. 10A  FIG. 10B
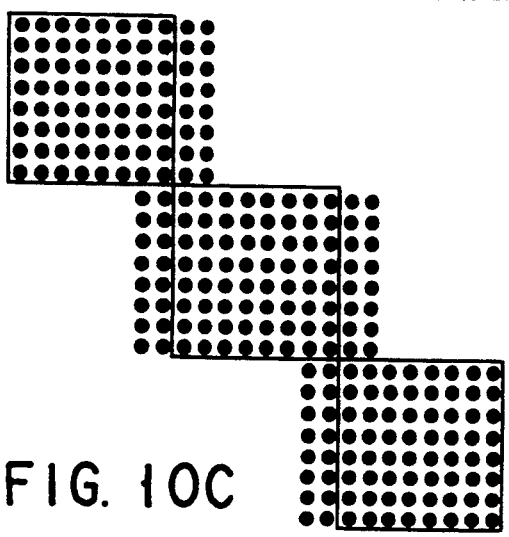
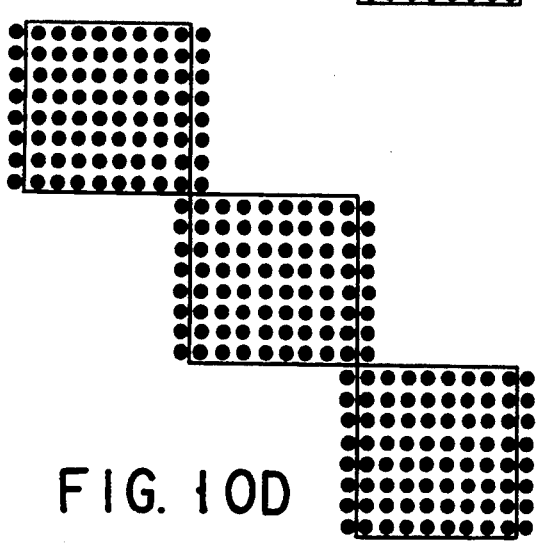
FIG. 10C  FIG. 10D

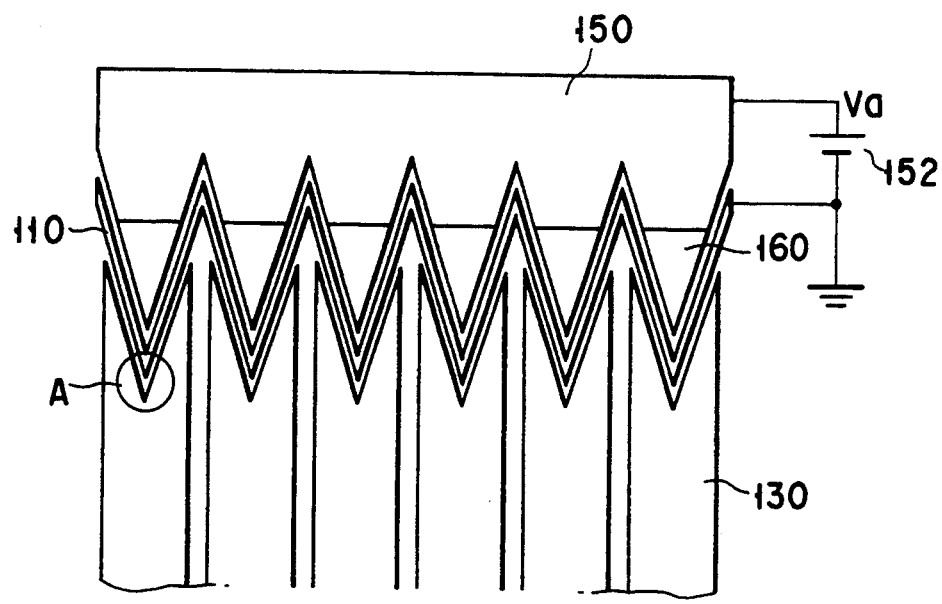
F I G. 13A
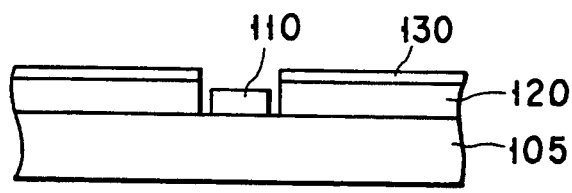
F I G. 13B
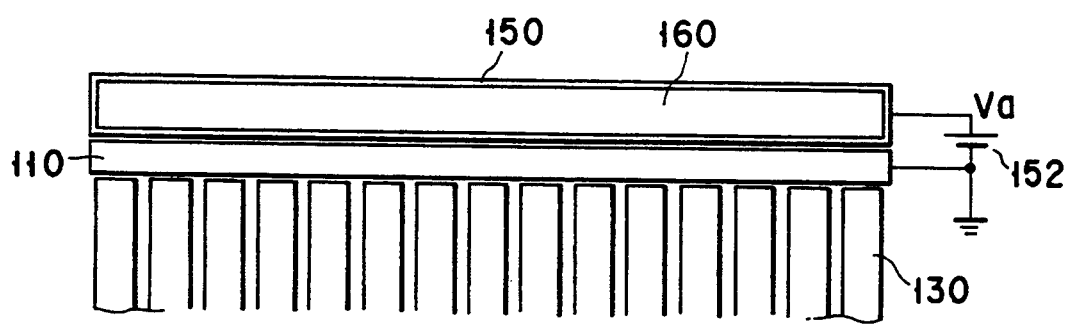
F I G. 14

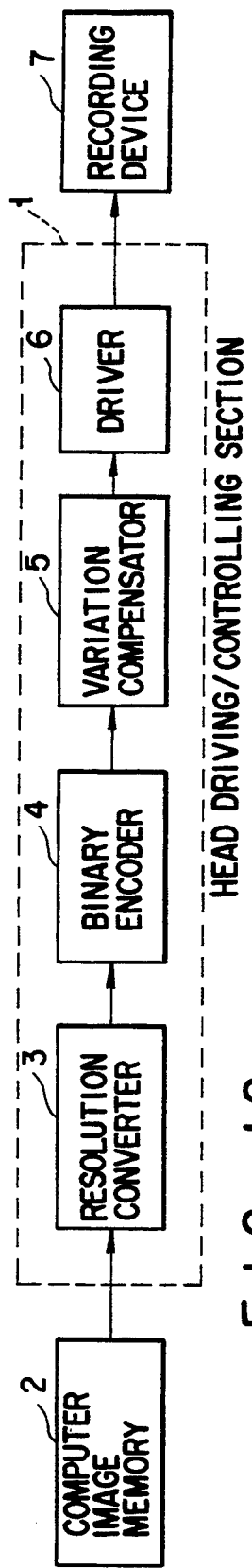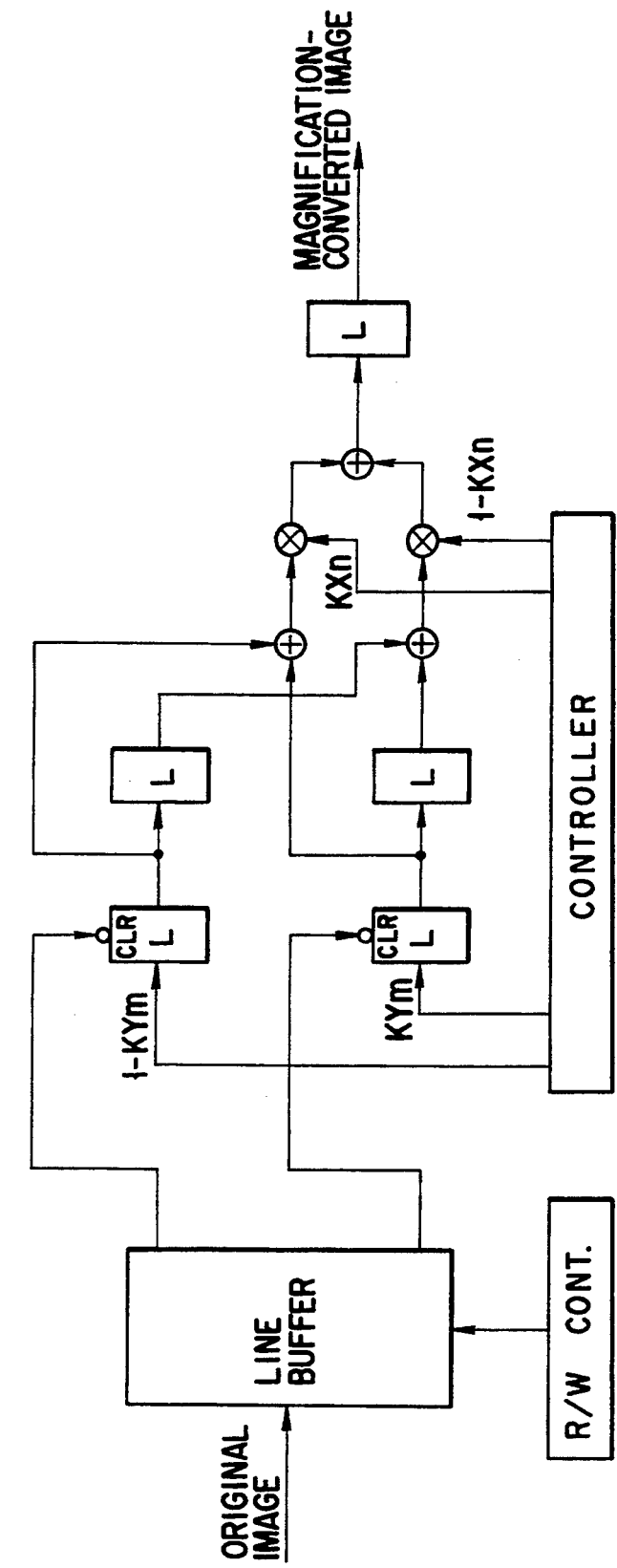

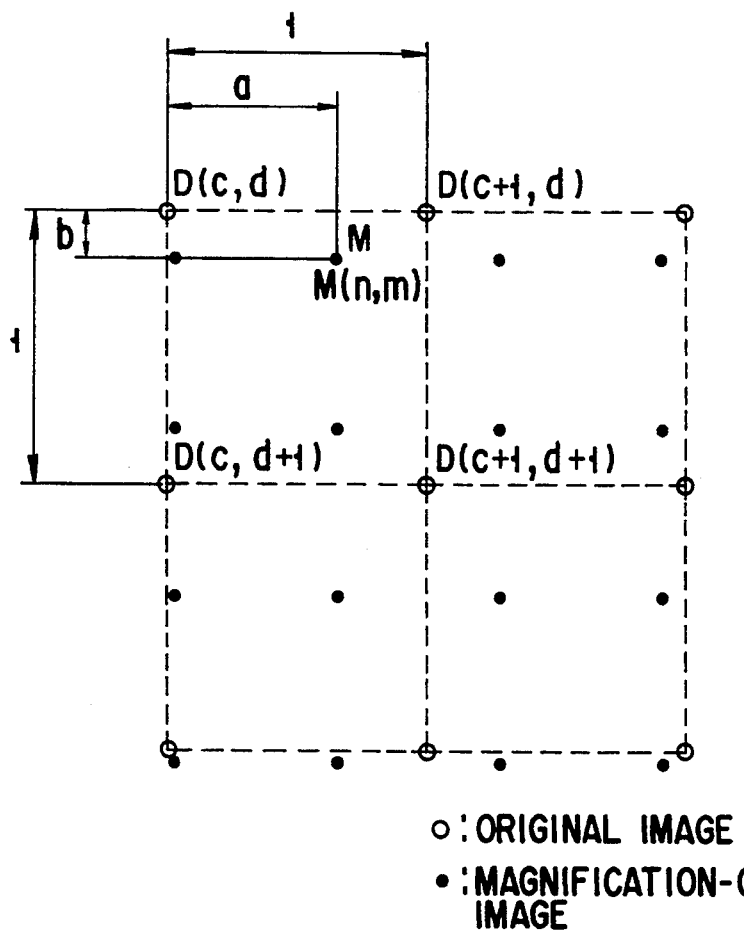
○ : ORIGINAL IMAGE
● : MAGNIFICATION-CONVERTED IMAGE
F I G. 20
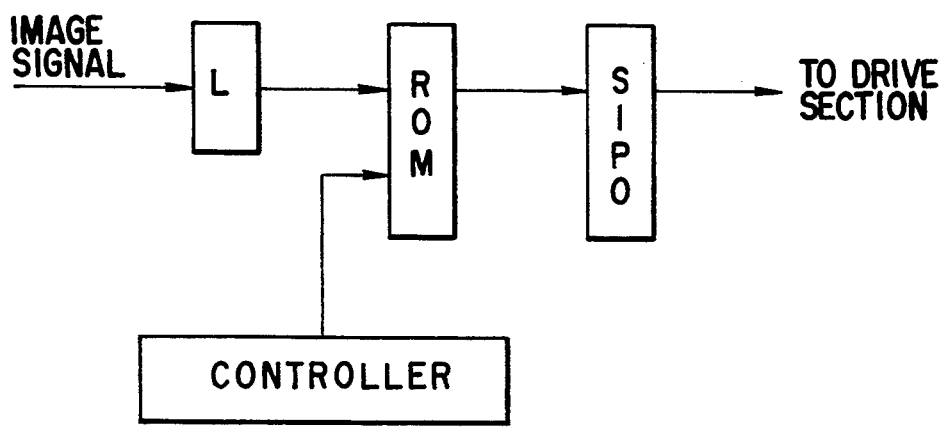
F I G. 22

ELECTROPHOTOGRAPHIC RECORDING APPARATUS

BACKGROUND OF THE INVENTION

1. Field of the Invention

This invention relates to an electrophotographic recording apparatus, and more particularly to an electrophotographic recording apparatus using a recording array head.

2. Description of the Related Art

An electrophotographic recording apparatus is of non-impact recording type and is advantageous over various other recording apparatuses in that the operation noise is small, characters can be clearly recorded, the recording speed is high, and the running cost is relatively low. Because of the above feature, recently, the electrophotographic recording apparatus is used as an output terminal device of an OA instrument and the market for the electrophotographic recording apparatuses is rapidly growing.

The outline of the electrophotographic recording apparatus is explained with reference to FIG. 1. FIG. 1 is a schematic view of the recording section of a laser printer which is one type of electrophotographic recording apparatus.

As shown in FIG. 1, the electrophotographic recording apparatus generally uses a photosensitive drum 200. The entire surface of the photosensitive drum 200 is uniformly charged by negative charges to approximately $-700$ V, for example, by use of a charging unit 201 of corona charging type. Next, a recording light 202 is applied to the surface of the photosensitive drum 200 according to an image signal. Since the resistance of only that portion of the photosensitive drum 200 which is illuminated is lowered, the negative charges on that portion of the photosensitive drum 200 to which the recording light 202 is applied are eliminated, thus making an electrostatic latent image. In this case, the recording light 202 is generally a laser light and the light modulated according to the image is scanned by a rotating polygon mirror. A laser for emitting the laser light is formed of one semiconductor laser.

The electrostatic latent image formed in the above-described manner is developed by a developing unit 203. The developing unit 203 attaches toners which are colored fine particles and negatively charged by the negative image development, for example, to that portion of the electrostatic latent image on the photosensitive drum 200 from which negative charges are removed by application of a development bias voltage of approximately $-500$ V, thereby converting the electrostatic latent image into a visible image.

Recording paper 205 taken out from a paper cassette (not shown) by a paper supply roller 204 is fed in synchronism with an image signal and brought into contact with the photosensitive drum 200. When the recording paper 205 is set in contact with the photosensitive drum 200, the visible image which is converted from the electrostatic latent image is transferred to the recording paper 205. In this case, a transfer charger 206 generates positive charges towards the rear surface of the recording paper 205, for example, to attract the image developed by the negatively charged toners on the photosensitive drum 200 onto the recording paper 205, thus transferring the image to the recording paper. The recording paper 205 to which the image is transferred by the transfer charger 206 is separated from the photosensitive drum 200 by a separation charger 207. Finally, the toners are heated and pressed in a fixing unit 211 constructed by heating rollers 210 and thus fixed on the recording paper 205, and the recording process is completed.

Toners which are not transferred to the recording paper 205 are left behind on the photosensitive drum 200 after the image has been transferred. The remaining toners are scraped off by use of a cleaner constructed by a cleaning blade 208 to clean the photosensitive drum 200. After this, the entire surface of the photosensitive drum 200 is exposed to light from an erasing lamp 209 constructed by an LED or the like to remove the charges on the photosensitive drum 200.

As described above, in the electrophotographic recording apparatus, an image is formed by effecting the charging, latent image forming, transferring and fixing steps. The photosensitive drum 200 is cleaned in the cleaning step to be used for the next recording process.

The units used in the respective steps may be somewhat different in construction in different recording apparatuses, but have basically the same constructions as described above.

The laser printer has been explained above as a typical example of the electrophotographic recording apparatus. As the electrophotographic recording apparatus, not only the laser printer but also various apparatuses having different types of light emitting elements as recording heads for forming the electrostatic latent image are developed and manufactured. In the laser printer, image dots are scanned by light emitted from a single laser by use of a polygon mirror which is mechanically rotated at high speed or hologram, but at present, a fixed scanning type apparatus using an array-form light source starts to receive much attention by taking the small size and low price of the apparatus into consideration. For example, electrophotographic recording apparatuses using recording heads having optical shutter elements and light emitting elements such as fluorescent materials, LEDs, liquid crystal shutters, EL elements, and plasma light emitting elements which are arranged in an array form have been developed and put to practical use. The above recording heads are different in the recording method, but the driving/controlling methods for the recording elements are based on substantially the same principle. That is, the resolution of the recording elements is set to coincide with that of the image signal and a binary recording signal corresponding to the image signal is supplied to the recording elements to selectively drive necessary recording elements.

Each of the above electrophotographic recording apparatuses is called an optical printer and is used as an output device of a digital copying machine or a printer. An analog copying machine which copies an original by applying light from a fluorescent lamp or the like to the original and guiding the reflected light to a photosensitive body to form an electrostatic latent image is also one type of electrophotographic recording apparatus.

As described above the electrophotographic recording apparatus has excellent features and is widely used as the output terminal device of an OA instrument, various systems have been developed, and the market thereof is rapidly growing.

The electrophotographic recording system is roughly divided into two recording systems. The first recording system is used to record an image of one line by creating an image recording signal by use of one element and scanning the element in a main scanning direction (which is the direction along the rotation axis of the photosensitive drum 200, the main scanning direction is thus defined in the following explanation and the rotation direction of the photosensitive drum 200, that is, a direction perpendicular to the main scanning direction is defined as a sub-scanning direction), and a laser printer for scanning a laser light by use of a polygon mirror is a typical example of this system. On the other hand, the second recording system is a recording system which is called a fixed scanning system for creating an image of one line by arranging a large number of light emitting elements and optical shutters on a line (in an array form) and individually controlling the elements.

The feature of the first recording system is that all of the image dots are created by light emitted from a single light source and therefore there occurs no variation in the density of the image dots. Therefore, this system is extremely suitable for recording a graduation image. However, since the entire surface of the recording paper is scanned by the same light, it takes a long time for the scanning operation, and in most cases of the apparatuses actually used, the recording speed is approximately 6 pages/min. In order to attain the higher scanning operation speed, a motor for rotating the rotating polygon mirror and motor bearings must be specially and precisely designed.

In contrast, in the fixed scanning type system, since one line can be simultaneously scanned, it is easy to enhance the recording speed. Further, since it is not necessary to provide a long optical path for scanning, the size can be reduced. Since the recording head is disposed in the close vicinity of a recording medium, it is easy to precisely set the head to a desired position. Thus, the array-form recording head has some advantages which the laser printer does not have.

However, some problems caused by use of a large number of elements occur.

The first problem is that since a large number of elements, for example, 3360 dot elements in the case of a recording head having the A4-width of 16 dots/mm are arranged on one line, the light emission amount and light transmission amount of the elements may be different from one another so that the densities of the recording image dots may vary. The variation is significantly different for each system, but it is approximately 30% in the LED array head, and when a half-tone image is recorded, difference between outputs of the respective elements appear as noise, thereby degrading the image quality. If the variation is 15 to 30%, no substantial influence will occur in the case of recording of binary information such as characters. However, in the recording of graduation image or full color image, high density portions and low density portions appear in a stripe form or the same color appears different in different positions. As a method for compensating for this variation, a method of compensating for the variation by separately recording one pixel in a plurality of cycles and effecting the pulse width modulation is proposed, but in this case, the variation can be reduced only to approximately 10%.

The second problem is that when an oblique line is recorded, notches whose magnitude corresponds to the resolution of the recording head appear on the contour. Further, when a multivalue image is recorded, a plurality of elements must be used in the dither method so that the resolution may be lowered and the texture of the dither will appear as noise.

SUMMARY OF THE INVENTION

An object of this invention is to provide an electrophotographic recording apparatus which can record with extremely high resolution and has an extremely small driving ability.

The electrophotographic recording apparatus of this invention is characterized in that a plane electron source having minute cold cathodes arranged in an array form in a plane is used as a recording head. That is, the electrophotographic recording apparatus of this invention is characterized by comprising a substrate; a plurality of recording elements formed on the substrate and each including at least one first electrode for emitting electrons in a preset voltage condition and at least one second electrode disposed to face the first electrode and selectively applied with a voltage which is positive with respect to the first electrode, for causing a selected first electrode to emit electrons; a light emitting section including an acceleration electrode for accelerating electrons emitted from the first electrode and a fluorescent layer for emitting light from a portion against which the electrons accelerated by the acceleration electrode collide; and a photoconductive medium which is uniformly charged and on which an electrostatic image is formed by application of light emitted from the fluorescent layer.

The above electrophotographic recording apparatus is further characterized in that the acceleration electrode is formed on the substrate, the fluorescent layer is formed on the acceleration electrode, and the contact surface between the acceleration electrode and the fluorescent layer is set in the same plane as the second electrode. The above electrophotographic recording apparatus is also characterized by further comprising a driving circuit formed on the substrate, for selectively applying a driving voltage to the recording elements.

Further, the above electrophotographic recording apparatus is characterized in that a preset number of the recording elements are allocated to one pixel of an input image signal in order to attain the resolution higher than that of the input image signal; and characterized by further comprising means for individually driving the recording elements in one pixel of the input image signal. In addition, the above electrophotographic recording apparatus is characterized in that a preset number of the recording elements are allocated to one pixel of an input image signal in order to attain the resolution higher than that of the input image signal; and characterized by further comprising means for applying a voltage only to a preset number of recording elements among the plurality of recording elements corresponding to one pixel of the input image signal at the recording time.

Next, the above electrophotographic recording apparatus is explained in detail.

Recently, a plane electron source having minute cold cathodes arranged in an array form in a plane is actively developed. The technology related to the above description is disclosed in A. Ghis et al., "Sealed Vacuum Devices: Fluorescent Microtip Displays", IEEE Trans. Electron Devices, Vol. 38, No. 10, October 1991, pp. 2320–2322 and A. Kaneko et al., "Wedge-Shaped Field Emitter Arrays for Flat Display", IEEE Trans. Electron Devices, Vol. 38, No. 10, October 1991, pp. 2395–2397. A plane CRT is formed by emitting electrons from the array-form electrodes in vacuum by field emission and striking the electrons against the fluorescent body to emit light. The plane CRT is thin and light in weight in comparison with the conventional plane CRT. Further, the study on the features of planar type triodes which are made on an experimental basis with the same technique has started. The size and pitch of the minute cold cathode array can be made as small as several $\mu$m.

The principle of the operation of the minute cold cathode array and a plane CRT using the cathode array are explained with reference to FIGS. 2A to 3.

FIG. 2A is a view for illustrating the operation of the cold cathode. A cone-form cathode 110 (which is also referred to as an emitter in the embodiment) is formed on a substrate 105 which is formed of semiconductor such as silicon. The cathode 110 is formed in substantially the central position of an opening 135 formed in a gate electrode 130. The gate electrode 130 is electrically isolated from the cathode 110 by means of an insulating layer 120.

FIG. 2B is a view obtained by observing the cold cathode array of FIG. 2A in an oblique direction and showing the opening 135 formed in the gate electrode 130 and part of the cathode 110 disposed in the opening 135. In FIG. 2B, an example in which a large number of openings 135 and cathodes 110 are arranged in an array form is shown.

If, in the above condition, a gate voltage 132 is applied to the gate electrode 130, electrons 112 are emitted from the front end portion of the cathode 110 by the effect of intense electric field between the cathode 110 and the gate electrode 130. At this time, if an anode voltage 152 is applied between an anode (which is also referred to as an anode electrode in the embodiment) and the cathode 110, the electrons 112 emitted from the cathode 110 are attracted towards the anode 150 and reach the anode while being accelerated. Since a fluorescent layer 160 is coated on the anode 150, the fluorescent layer 160 emits light when the electrons collide with the fluorescent layer.

The operation principle of the display by the effect of the field emission of electrons has been described above. FIG. 2A illustrates the phenomenon occurring in a vacuum or in a container filled with an inert gas.

FIG. 3 shows an example of using the minute cold cathode array utilizing the field emission of electrons for a color display.

In this example, cathode electrodes 115 (which are also referred to as emitter electrodes in the embodiment) are formed on a glass substrate 105. The cathode electrodes 115 are connected to cathode cones, and in FIG. 3, they are arranged in a continuous stripe form in the lateral direction. In FIG. 2A, the cathode electrode 115 is not shown since it is assumed that the substrate 105 is formed of semiconductor such as silicon. Cone-form cathodes 110 are formed on the cathode electrodes 115. Gate electrodes 130 are arranged in a stripe form in a direction different from that of the cathode electrodes 115. In the gate electrodes 130, a large number of holes are formed to surround the corn-form cathodes. The cathode electrodes 115 are electrically isolated from the gate electrodes 130 by means of an insulating layer 120 having holes formed therein.

If the stripe-form cathode electrodes 115 and gate electrodes 130 are sequentially selected and a voltage is applied between the selected electrodes, electrons are emitted from only the cathode cone of the selected portion. The electrons are accelerated by an electric field created by an anode 150 formed on the glass substrate and reach fluorescent layers 160 formed on the anode 150, thereby causing the fluorescent layers to emit color lights. The fluorescent layers are formed to emit color lights of R, G and B and serve as a color display.

The above example is a plane CRT developed by LETI Co. in France, and the gate voltage is 80 V and the anode voltage is 400 V. The faceplate size is 110×90 mm$^2$, the number of pixels is 256×256 and Spindt type cold cathodes are arranged in an array form with a density of 10000/mm$^2$. Therefore, the number of cold cathodes for each pixel is approximately 1200. The display has a significant feature that the display luminance is 300 cd/mm$^2$ in the case of ZnO fluorescent and the power consumption is as low as 1 W for 100 cm$^2$.

In this invention, it is a feature that the minute cold cathode array is used for the light emitting element of a printer. In the electrophotographic recording apparatus of this invention, minute cold cathodes are arranged in an array form in a plane and a plane electron source for emitting electrons from the cold cathodes by the effect of field emission is used as a light emitting element so that the electrophotographic recording apparatus having the following features can be attained.

(1) The power consumption of the minute cold cathode array is extremely low. Since a current used for the minute cold cathode is several A for each dot and is extremely small in comparison with the conventional solid optical head, the power consumption of the recording apparatus can be reduced. An apparatus of low power consumption which can be driven by a battery can be made when a portable type electrophotographic recording apparatus is realized.

(2) The minute cold cathode array can create an extremely small image dot of high resolution. The minute cold cathode array can create an extremely small image dot with a pitch of high resolution of approximately 300 dots/mm which is higher than ten times the resolution of the present printers which is 10 to 20 dots/mm. Therefore, approximately 100 minute cold cathodes can be used for recording one image dot. Therefore, even if the light emission outputs of the minute cold cathodes are somewhat different from one another, the light emission outputs can be averaged and variations in the light emission outputs can be compensated for by using a large number of minute cold cathodes, thus making it possible to suppress a variation in the density of each pixel with the resolution of approximately 10 dots/mm. If a difference between the light emission outputs becomes further increased, a variation in the light emission outputs can be suppressed by inhibiting some of the minute cold cathodes from emitting lights by use of a control signal.

(3) Since one image dot is created by use of a large number of minute cold cathodes, the stable graduation recording can be attained by controlling the number of minute cold cathodes to be activated.

(4) A recording apparatus capable of recording an image with the resolution of up to approximately 300 dots/mm can be realized by utilizing the extremely high resolution and independently driving the minute cold cathode array. In the normal recording operation, such an image dot with such a high resolution is not necessary, but when it is required to record a character having a smooth contour and no notched or stepped contour, the high resolution image dots may be effectively used to record the edge portion of the character with a smooth contour. A printer capable of recording clean characters with smooth contour can be realized by use of the recording apparatus having the above recording head. Further, in addition to the above smoothing effect, conversion of the resolution (enlargement and reduction) can be freely attained by use of the extremely high resolution. Further, since the pitch and size of an image dot can be freely set by driving only the necessary elements in one image dot, the compensation for variation, the smoothing and the graduation recording free from deterioration in the resolution can be attained.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 9A and 9B are diagrams for illustrating a method of recording at a high resolution;

FIGS. 10A to 10D are diagrams for illustrating a method of imitatively recording at a high resolution by driving the minute cold cathode array for each block;

FIGS. 13A and 13B are perspective view and plan view of a second modification of the recording head applied to the apparatus of this invention;

FIG. 14 is a plan view of a third modification of the recording head applied to the apparatus of this invention;

FIG. 19 is a block diagram showing an example of a flow of the process effected by the driving/controlling apparatus of this invention;

FIG. 20 is a diagram for illustrating the principle of the resolution-conversion (magnification-conversion) by use of the linear interpolation;

FIG. 21 shows a circuit image of the resolution conversion of this invention;

FIG. 22 is a block diagram showing the schematic construction of a second embodiment of this invention.

DETAILED DESCRIPTION OF THE PREFERRED EMBODIMENTS

There will now be described an embodiment of this invention with reference to the accompanying drawings.

Figure 1:
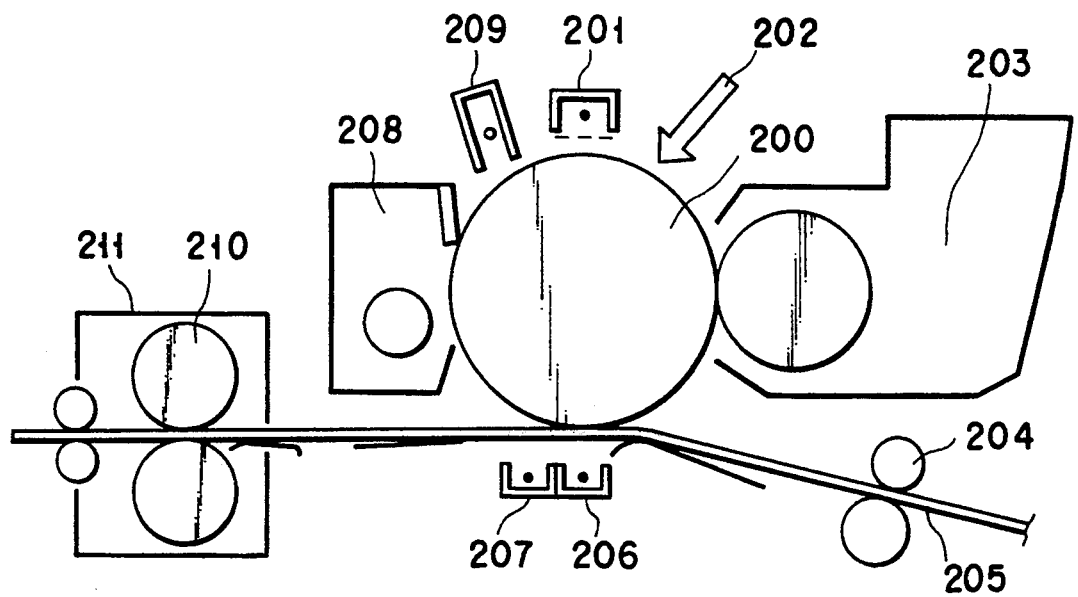
FIG. 1 is a view for illustrating the conventional electrophotographic recording apparatus.
Figure 3:
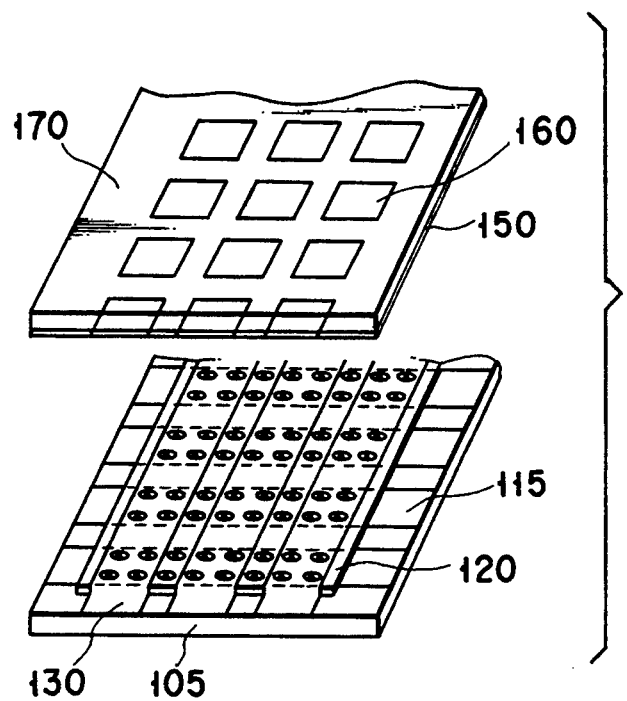
FIG. 3 is a view showing an example in which the minute cold cathode array utilizing the field emission of electrons is used in a color display.
Figure 2A:
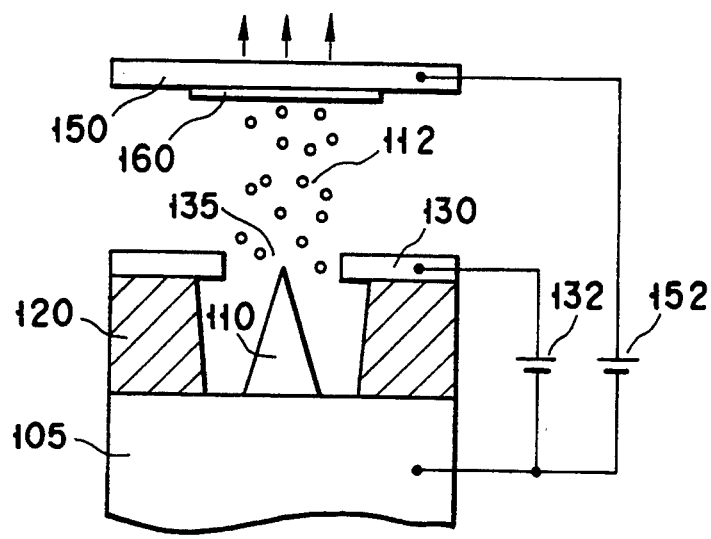
FIGS. 2A and 2B are views for illustrating the conventional display having a fluorescent body which emits light when electrons emitted from a minute cold cathode array collide therewith.
Figure 2B:
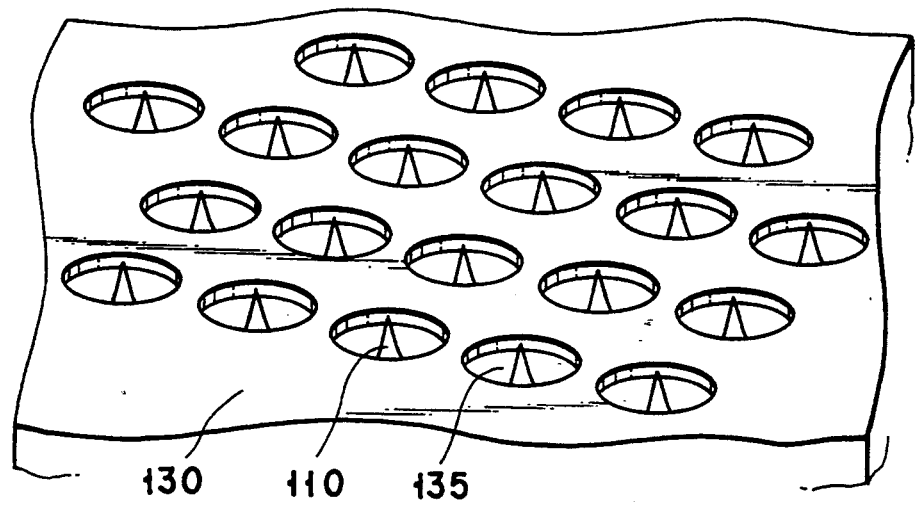
Figure 4:
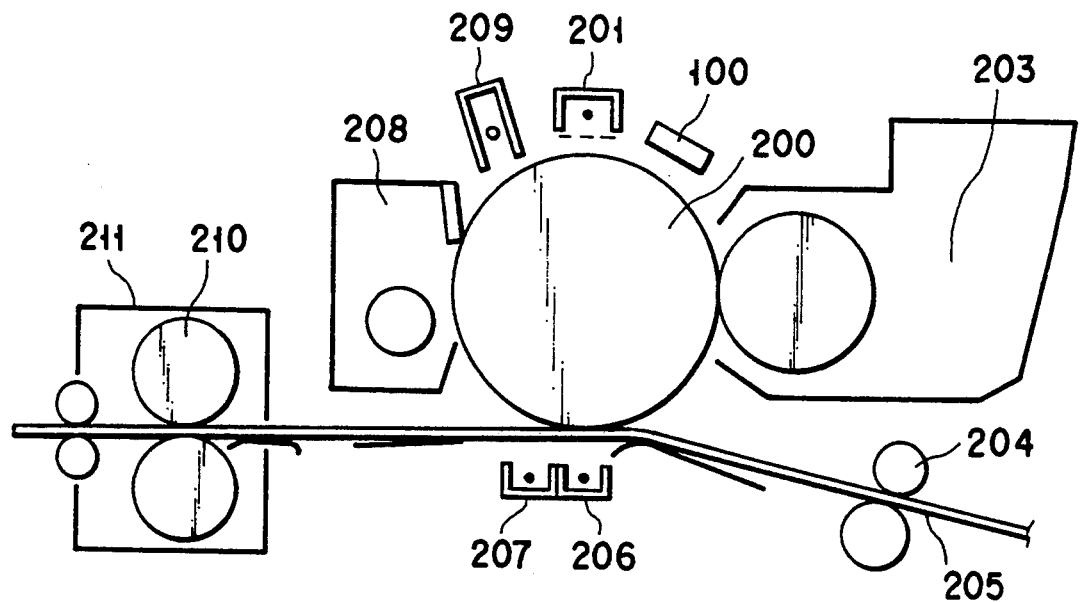
FIG. 4 is a view showing the schematic construction of an electrophotographic recording apparatus of this invention utilizing a recording head having a minute cold cathode array.
Figure 5:
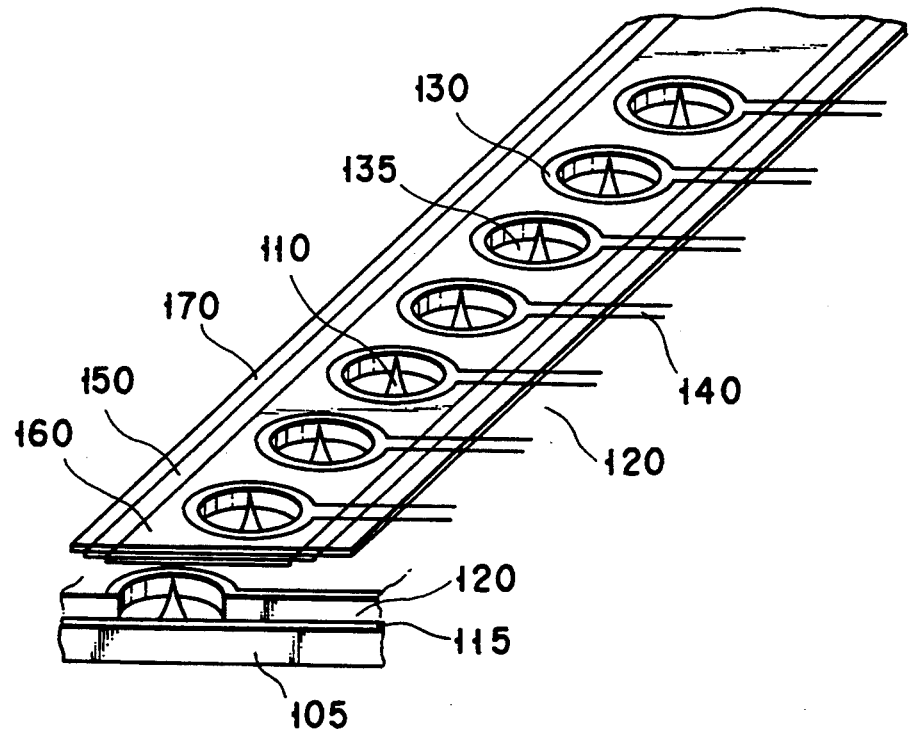
FIG. 5 is a perspective view of a recording head having minute cold cathodes arranged in an array form and applied to an electrophotographic recording apparatus of this invention.

FIG. 4 is a view showing the schematic construction of an electrophotographic recording apparatus of this invention utilizing a recording head having a minute cold cathode array and FIG. 5 is a perspective view of a recording head having minute cold cathodes arranged in an array form and applied to an electrophotographic recording apparatus of this invention.

As shown in FIG. 4, the electrophotographic recording apparatus of this invention can be realized by the recording head portion of the conventional electrophotographic recording apparatus by a recording head 100 having a minute cold cathode array.

A photosensitive drum 200 is directly exposed to light which is emitted from the recording head 100 having the minute cold cathode array or exposed to the light via a SELFOC lens (not shown) to form an electrostatic latent image thereon. Since the minute cold cathodes are arranged in an array form in the axial direction of the photosensitive drum 200 (in the main scanning direction), a pattern of the 2-dimensional electrostatic latent image can be formed by sequentially changing the light emission pattern while rotating the photosensitive drum 200. The electrostatic latent image thus formed is developed, transferred and fixed on the recording paper in the same manner as in the conventional electrophotographic recording apparatus (since the process is the same as that of the conventional case, the explanation for the process is omitted).

As described above, since a fixed scanning type recording apparatus which does not require an optical system which is required in the laser printer can be realized by replacing the recording head of laser optical system by the recording head 100 having the minute cold cathode array, the size of the recording apparatus can be reduced. The recording apparatus is advantageous over the other fixed scanning type recording apparatus in that the power consumption can be reduced and the recording can be effected with the extremely high resolution of 5000 dpi or more.

Next, the construction of the recording head 100 applied to the recording apparatus of this invention is briefly explained with reference FIG. 5. FIG. 5 is a perspective view of the recording head 100 as viewed from the light emission surface side.

Each minute cold cathode element includes a ring-shaped gate electrode 130 having an opening 135 formed therein and a cone-shaped emitter 110 disposed in the opening 135. An electrode 140 is integrally formed with the gate electrode 130 which is thus connected to a driving circuit (not shown) via the electrode 140. The gate electrode 130 is formed on an insulating layer 120 and the opening 135 is formed in the insulating layer 120 and the gate electrode 130. Further, an emitter electrode 115 is formed between the rear surface of the insulating layer 120 and a glass substrate 105. A large number of such minute cold cathodes are arranged in an array form to construct the recording head 100.

A glass substrate 170 formed of a transparent electrode 150 having a fluorescent layer 160 formed thereon is disposed above the minute cold cathode array.

A method of emitting light from the minute cold cathode array with the above construction is explained.

Voltages are independently and selectively applied between the emitters 110 and the gate electrodes 130 by means of the driving circuit (not shown). The electric field in the minute cold cathode element applied with the voltage is concentrated in the opening 135 of several $\mu$m between the gate electrode 130 and the emitter 110 and becomes extremely intense. When an intense electric field of approximately $10^6$ to $10^7$ V/cm is generated, the field emission of electrons from the emitter 110 is started.

Since electrons emitted from the emitter 110 have negative charges, the emitted electrons can be accelerated in a direction towards the glass substrate 170 by applying a voltage between the emitter 110 and the transparent electrode 150 with the transparent electrode 150 set at the positive side. The accelerated electrons collide against the fluorescent layer 160 formed on the transparent electrode 150 to cause the fluorescent layer 160 to emit light. The fluorescent layer 160 is formed to continuously extend in a direction along the array of the minute cold cathodes, but the fluorescent layer 160 can emit light in a desired pattern according to the field emission of electrons from the selected minute cold cathodes since the field emission of electrons from the selected minute cold cathodes can be independently controlled for each minute cold cathode. The light is transmitted via the glass substrate 170 and reaches the surface of the recording head 100. An electrostatic latent image can be formed on the photosensitive drum 200 by guiding the light from the recording head 100 to the photosensitive drum 200.

As a method of manufacturing the minute cold cathode array element shown in FIG. 5, a most typical manufacturing method using the side etching technique is explained with reference to FIGS. 6A to 6G. In the example of FIG. 5, the glass substrate 105 and the emitter electrode 115 are separately formed, but since an n-type substrate is used as a substrate in this example, the emitter electrode 115 is not necessary.

Figure 6A:
FIGS. 6A to 6G are views showing the process of manufacturing a minute cold cathode array.
Figure 6B:
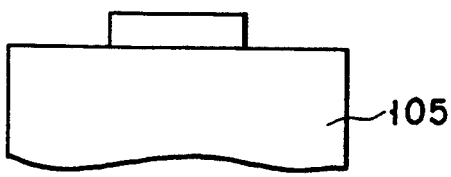
Figure 6C:
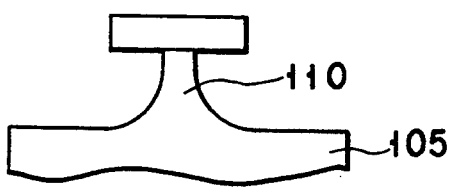
Figure 6D:
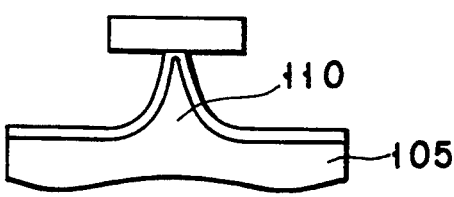
Figure 6E:
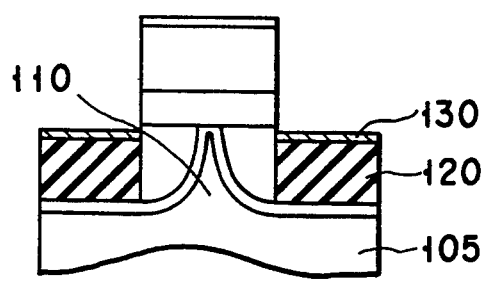
Figure 6F:
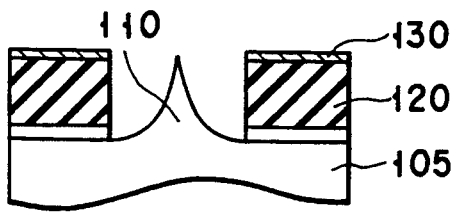
Figure 6G:
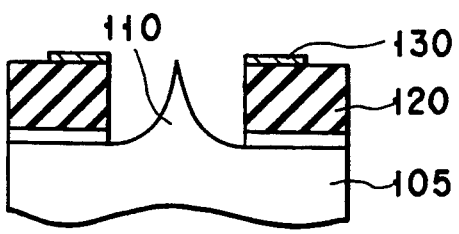

A thermal oxide film is formed in a circular form on the n-type silicon substrate 105 (FIG. 6A). The silicon is selectively etched by the reactive ion etching (RIE) with the thermal oxide film used as a mask to form an emitter chip (FIG. 6B). At this time, the etching condition is adequately set so that the side etching may occur. By the side etching, a cone which will become an emitter 110 is formed and the etching process is completed with the mask left behind (FIG. 6C). After this, the silicon is thermally oxidized to form an oxide film on the surface of the emitter chip (FIG. 6D). After an insulating film 120 and a gate electrode film 130 are formed by vapor deposition (FIG. 6E), the structure is dipped into a hydrofluoric acid to remove the thermal oxide film on the surface of the emitter chip and thus remove the mask and the insulating film and electrode formed on the mask by the liftoff technique (FIG. 6F). The gate electrode 130 is patterned, and thus formation of the emitter 110 and the gate electrode 130 is completed (FIG. 6G). Then, an anode formed of a fluorescent plate (not shown) is attached to the structure to complete a recording head. The anode is constructed by forming a transparent electrode layer 150 and fluorescent layer 160 on a glass substrate 170.

As described above, the method of manufacturing the element includes only the semiconductor process except a step of attaching the anode. Therefore, it is possible to form a logic circuit such as a driver or controller in a space on the substrate in which the light emitting element is not formed.

The basic structure of the recording head is substantially the same as the structure of the display used in the explanation of the conventional case, but the apparatus of this invention applied to the recording head of the electrophotographic recording apparatus has the following features. First, the apparatus of this invention can independently drive the individual minute cold cathode elements. Second, since the image can be formed by scanning the surface of the photosensitive drum, the minute cold cathode elements are arranged on a row, a direction along the array of the minute cold cathode elements is set as a main scanning direction and a direction perpendicular to the main scanning direction is set as a sub-scanning direction (that is, a direction in which the recording head is moved). As a result, the recording with the extremely high resolution of 5000 dots/inch or more could be attained.

Next, the arrangement of the elements, modification of the element, and the driving circuit for the element are explained.

Figure 7A:
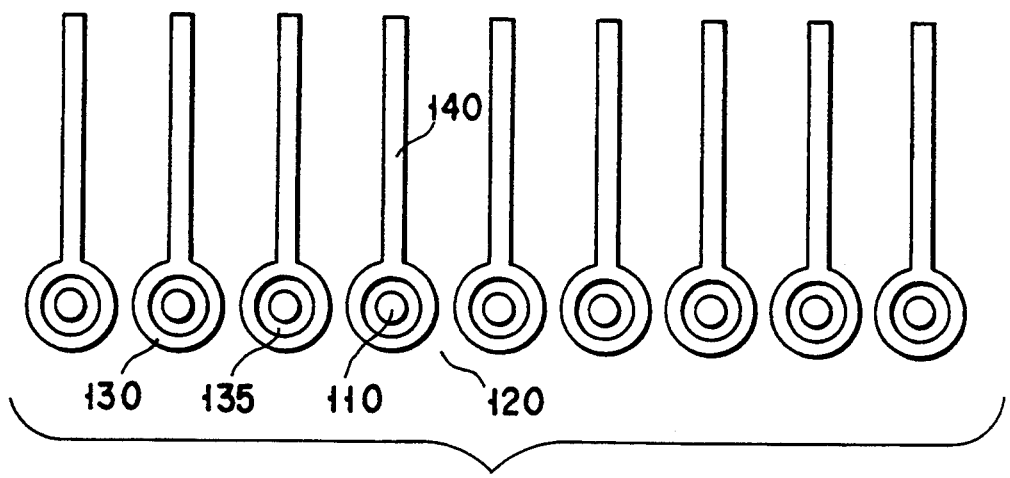
FIGS. 7A and 7B are views showing the minute cold cathode array of a recording head.
Figure 7B:
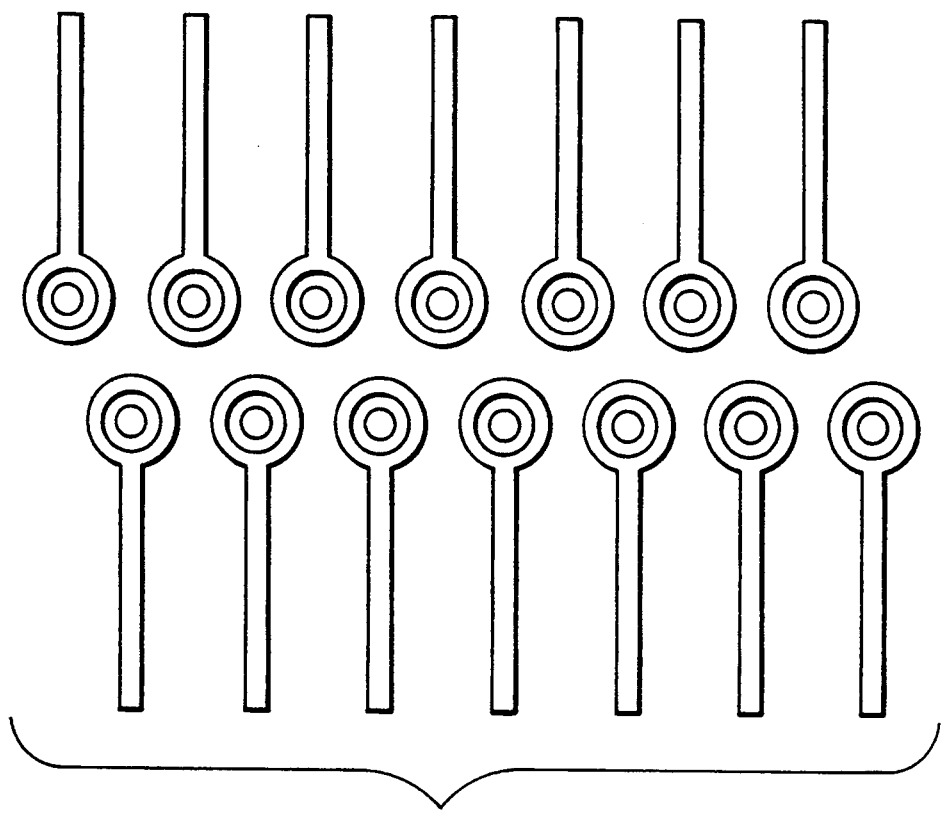

An example of the arrangement of the elements is shown in FIGS. 7A and 7B.

FIG. 7A is a plan view of a light emitting element 1 using the minute cold cathode array shown in FIG. 5 as viewed from the gate electrode side. In FIG. 7A, in order that a portion of the gate electrode 130 can be clearly observed, the fluorescent layer 160, transparent electrode 150, glass substrate 170 and the like which are formed on the gate electrode are omitted. Thus, as shown in FIG. 7A, the insulating layer 120 and the gate electrode 130 having an opening 135 formed therein can be observed and the emitter 110 can be observed in the opening 135. In the light emitting recording element shown in the embodiment of FIG. 5, the minute cold cathodes shown in FIG. 7A are arranged on a row. A direction along the array of the minute cold cathode elements is set as a main scanning direction and a direction perpendicular to the main scanning direction is set as a sub-scanning direction (that is, a direction in which the photosensitive drum is rotated). Electrodes 140 are led out from the respective minute cold cathodes and connected to respective driving circuits.

FIG. 7B shows an example in which the minute cold cathode elements are arranged in a staggered fashion instead of being arranged on a row in the main scanning direction as shown in FIG. 7A.

In the case of the arrangement of the elements shown in FIG. 7A, gaps may occur between the minute cold cathode elements arranged in the main scanning direction. In a case where the recording operation is effected with the extremely high resolution of 5000 dpi or more, an influence by such gaps will not appear in the actual recording sample. However, in a case where the recording operation is effected with the resolution of approximately 300 dpi, an influence by such gaps may sometimes appear. As an example of a method for preventing occurrence of such gaps, a method for arranging the minute cold cathode elements in a staggered fashion as shown in FIG. 7B instead of arranging them on a row in the main scanning direction may be used. With this arrangement, since the openings 135 are continuously arranged in the main scanning direction, no gap is made and the resolution can be enhanced. Instead, since the openings 135 are disposed in deviated positions in the sub-scanning direction, it is necessary to delay a signal. For example, in the case of this embodiment, it is necessary to delay two lines of the recording signals for the even-numbered minute cold cathodes and odd-numbered minute cold cathodes with respect to the other recording signal by one line.

In the example shown in FIG. 7B, electrodes 140 for signal transmission are formed to extend in opposite directions. This is because the electrode must be formed to pass through between the minute cold cathodes which are adjacent to each other in the main scanning direction and the extremely high wiring technique is required to form the electrodes 140 when all of the electrodes are formed to extend in the same direction. Therefore, the electrodes 140 are formed to extend in opposite directions so that they can be easily formed. Also, in the case of FIG. 7A in which the minute cold cathodes are arranged on a row, it is possible to form the electrodes 140 to extend in the opposite directions. In the embodiment of FIG. 7B, two lines of the recording signals for the even-numbered minute cold cathodes and odd-numbered minute cold cathodes are delayed with respect to the other recording signal. However, in a case where the recording operation is effected with the extremely high resolution of 1000 dpi or more, the positional difference of one line cannot be visibly observed and therefore it is not necessary to delay the recording signal.

The above element arrangement is made by taking a system for independently controlling the minute cold cathodes into consideration. Next, an example of the construction for simultaneously driving a preset number of minute cold cathodes is explained below. When a large number of minute cold cathodes are simultaneously driven, the resolution is lowered. However, the advantage obtained in this case is that the number of driving circuits, the amount of data and the capacity of a memory for storing the data can be reduced. Further, variations in the characteristics of the minute cold cathodes can be averaged by simultaneously driving a large number of minute cold cathodes and therefore a recording apparatus having a stable density characteristic can be realized.

FIGS. 8A to 8D are views showing examples of the construction in which a preset number of minute cold cathodes are simultaneously driven.

Figure 8A:
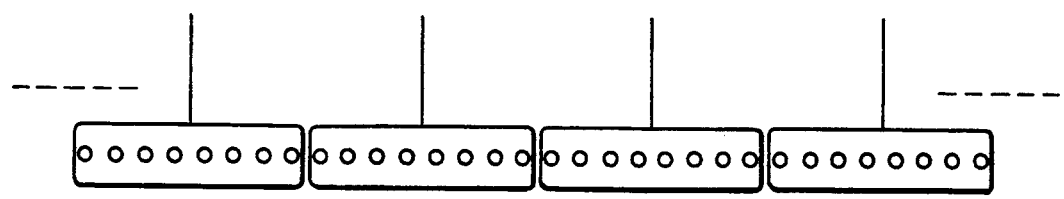
FIGS. 8A to 8D are views for illustrating a method of recording at a low resolution by driving the minute cold cathode array for each block.

FIG. 8A shows an example of the construction in which a preset number of minute cold cathodes successively arranged in the main scanning direction are simultaneously driven.

If eight minute cold cathode elements which are successively arranged in the main scanning direction are simultaneously driven as shown in FIG. 8A in a case where the pitch of the minute cold cathode elements is approximately 8 μm (which corresponds to approximately 3200 dpi), an image dot of approximately 64 μm in the main scanning direction can be formed. When the recording operation is effected with the extremely high resolution of 3200 dpi, 400 or more 64-bit driver ICs are required for the recording in the width direction of A4-paper, but the number of driver ICs used can be reduced to 50 by using the driving system shown in FIG. 8A. In the case of the construction shown in FIG. 8A, since the resolution in the sub-scanning direction is kept high, image dots of 400 dpi can be divided into eight groups in the sub-scanning direction. Therefore, in the case of the construction shown in FIG. 8A, the graduation recording of approximately eight graduation levels can be easily attained.

Figure 8B:
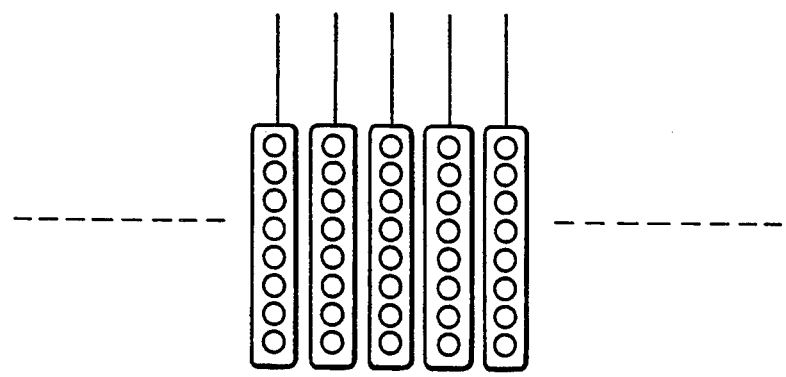

FIG. 8B shows an example of the construction used in a case where a plurality of elements successively arranged in the sub-scanning direction are simultaneously driven.

In the example of FIG. 8B, eight cold cathode elements successively arranged in the sub-scanning direction are simultaneously driven, and if the pitch of the cold cathode elements is 8 μm, an image dot of approximately 64 μm (which corresponds to approximately 400 dpi) in the sub-scanning direction can be formed. In this case, the number of driving ICs is kept unchanged, but the feeding speed in the sub-scanning direction can be enhanced by eight times the original feeding speed. In the case of this embodiment, since the resolution in the main scanning direction is kept high, the graduation recording of approximately eight graduation levels can be easily attained by controlling the ON-OFF state of the eight pixels.

Figure 8C:
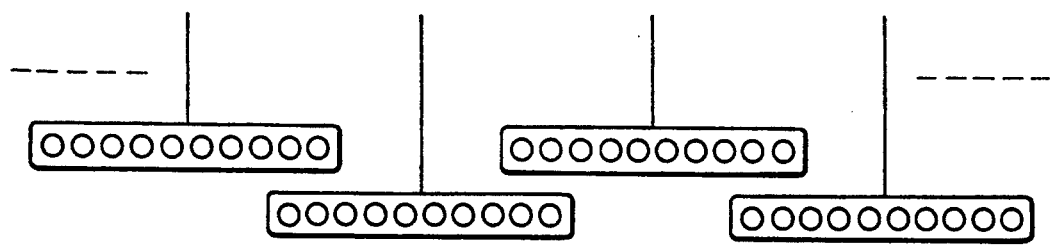

FIG. 8C shows an example of the construction in which a large number of cold cathode elements successively arranged in the main scanning direction are simultaneously driven like the case shown in FIG. 8A. However, this construction has a feature that adjacent pixels are partly overlapped with each other so that each pixel may smoothly continue to a next pixel. Thus, in this case, since adjacent pixels cannot be arranged on a row in the main scanning direction, the electrodes are arranged in a staggered form as shown in FIG. 8C. Therefore, the recording signal must be delayed by an amount corresponding to a distance separated in the sub-scanning direction.

Figure 8D:
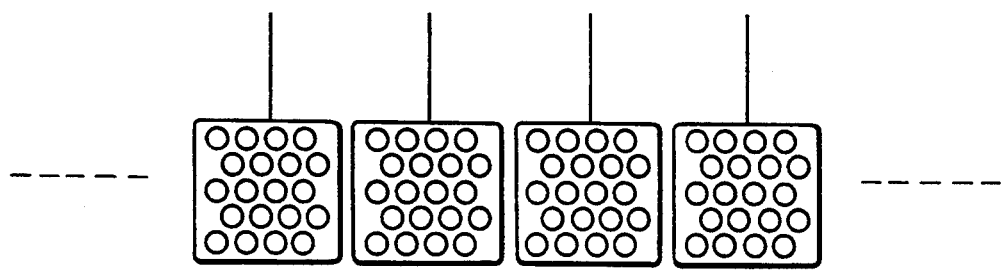

FIG. 8D is a diagram showing an example of the construction used in a case where one pixel is driven by electrons emitted by the field emission from a large number of cold cathode elements successively arranged in the main scanning direction and sub-scanning direction. By simultaneously driving such a large number of cold cathode elements, the number of driving ICs can be reduced and variations in the characteristics of the cold cathode elements can be averaged. Some examples of the construction of the minute cold cathode array are considered and there are some constructions of the minute cold cathode array which tend to increase variations in the characteristics thereof. If, in such a case, the cold cathodes are individually driven, a variation tends to occur in the density of the recording image after the development by use of toner. By simultaneously driving a large number of cold cathode elements to form one pixel, variations in the characteristics can be averaged and a variation in the density of each pixel can be suppressed. Of course, the same effect can be attained by simultaneously driving the respective cold cathodes, but the embodiment of FIG. 8D is advantageous in that the number of driving ICs can be reduced.

The recording operation with high resolution effected by using a recording head having a minute cold cathode array with extremely high resolution of this invention is briefly explained. Assume that the resolution of the recording head of this invention is 3200 dpi. For example, consider a case wherein an oblique line constructed by image dots of 400 dpi as shown in FIG. 9A is recorded. When a printer of 400 dpi is used, the oblique line is recorded with large steps as shown in FIG. 9A, and in the step portion, the image dots are set in point contact with each other. This is perceived by human eyes as visual noise. By using the pixel of extremely high resolution as in this invention, the recording of high resolution can be effected as shown in FIG. 9B. A signal with such a high resolution may be previously stored in a pattern generator or may be derived by calculation based on a recording pattern of 400 dpi. By using a recording head of this invention, a recording image can be made extremely smooth and free from large steps.

With the construction in which a plurality of elements are simultaneously driven as shown in FIGS. 8A, 8B and 8C, the connecting portion between pixels can be made smooth and the apparent resolution can be made extremely high. This example is explained with reference to FIGS. 10A to 10D. For example, in a case where the oblique line constructed by image dots with the resolution of 400 dpi shown in FIG. 9A is recorded, 8×8 image dots of extremely high resolution are used as shown in FIG. 10A. The oblique line can be easily recorded by use of a method for simultaneously driving eight image dots as shown in FIG. 8A or 8B. However, if this method is used as it is, the oblique line cannot be made free from large steps. Therefore, for example, in a case where a preset number of pixels successively arranged in the main scanning direction as shown in FIG. 8A are simultaneously driven, image points successively arranged in the main direction are additionally recorded near a position in which the image dots of low resolution are set in contact with each other in an oblique direction as shown in FIG. 10B, thereby preventing the image dots of low resolution from being set in point contact with each other so that the oblique line can be observed apparently smooth. Likewise, in the case of FIG. 8B, the oblique line is made apparently smooth by use of a method as shown in FIG. 10C.

In a case where image dots are partly overlapped as shown in FIG. 8C, image dots of low resolution are not in point contact with each other near the step portion as shown in FIG. 10D so that the oblique line can be made apparently smooth even if it is recorded as it is.

Other examples of the construction of the recording head using the minute cold cathode array are explained.

The recording head can be easily formed if it has a structure similar to the flat structure. In the case of the recording head shown in FIG. 5, the cone-shaped emitter electrode used for effecting the field emission of electrons is formed with a 3-dimensional structure, the gate electrode is formed with the 3-dimensional structure, and the glass plate having a fluorescent layer formed thereon is disposed in the 3-dimensional form in position facing the emitter electrodes and gate electrodes. An example in which a portion occupied by the 3-dimensional structure is reduced to the least possible degree and the yield of the recording head is enhanced is explained.

Figure 11A:
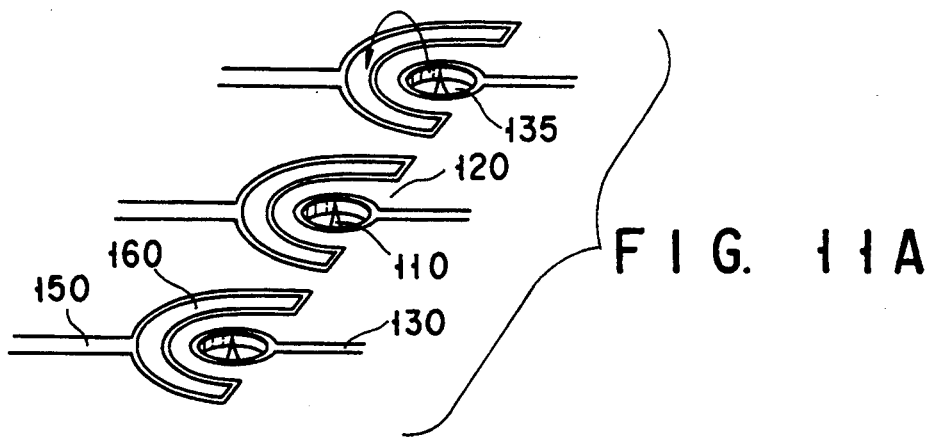
FIGS. 11A and 11B are perspective view and plan view of a first modification of a recording head applied to an apparatus of this invention.
Figure 11B:
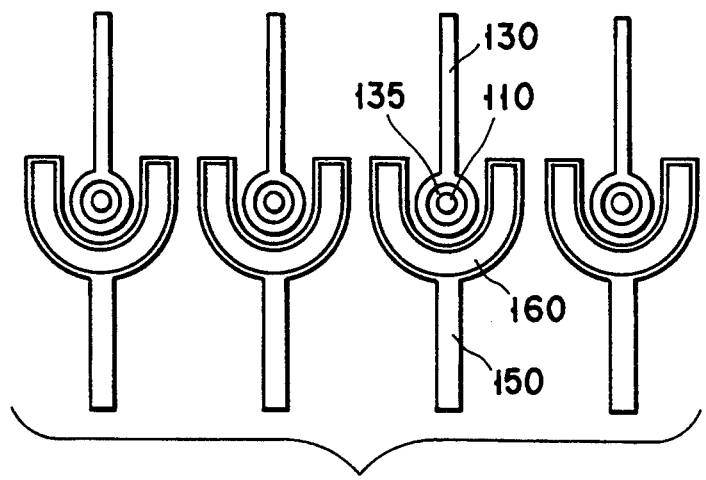

FIG. 11A is a perspective view showing the main portion including the emitter 110 of a recording head having the minute cold cathode array and the surrounding portion as a first modification and FIG. 11B is a plan view showing part of the main portion shown in FIG. 11A. In the first modification shown in FIGS. 11A and 11B, the structure of the gate electrode 130 and emitter 110 is the same as that of the minute cold cathode array shown in FIG. 5. In the recording head shown in FIG. 5, the cathode electrode 150 and fluorescent layer 160 are arranged to face the emitter 110 in a 3-dimensional form. However, in the recording head shown in FIGS. 11A and 11B, the cathode electrode 150 is formed on the same plane as the gate electrode 130 and the fluorescent layer 160 is formed on the cathode electrode 150. Of course, a transparent member such as a glass substrate is formed on the structure although not shown in the drawing and a space between the emitter 110 and the glass substrate is kept in a vacuum state.

In the case of this embodiment, electrons emitted from the emitter 110 are accelerated by the electric field created between the emitter 110 and the cathode electrode 150 and attracted and moved towards the cathode electrode 150 as indicated by an arrow shown in FIG. 11A. The electrons collide with the fluorescent layer 160 formed on the cathode electrode 150 to cause the fluorescent layer 160 to emit light. The thus emitted light is transmitted to the exterior via the glass layer and applied to the photosensitive drum to form an electrostatic latent image on the photosensitive drum. With this structure, it is not necessary to form the cathode electrode 150 and fluorescent layer 160 on the glass plate facing the emitter 110. Since the structure becomes extremely simple in comparison with the embodiment shown in FIG. 5, the process for forming the recording head is simplified, the yield is enhanced, and the manufacturing cost thereof can be lowered. Since the emitted light is transmitted to the exterior via the glass substrate, the light can be efficiently applied to the photosensitive drum which is disposed in the external position in comparison with a case wherein the light is emitted from the rear side and transmitted via the cathode electrode.

Figure 12:
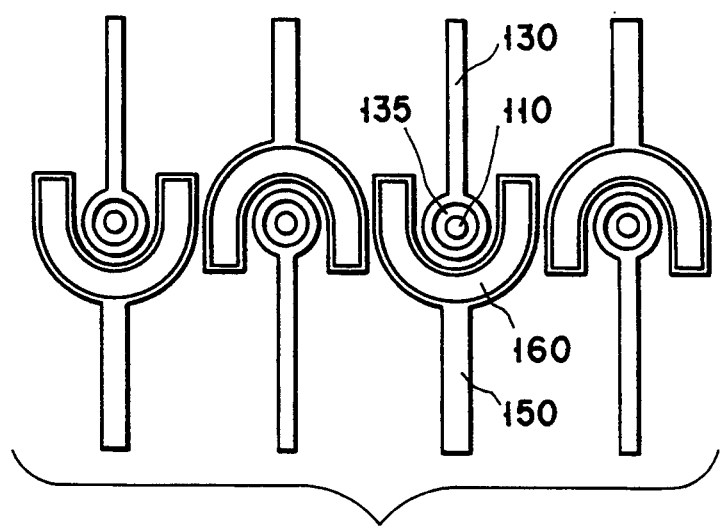
FIG. 12 is a view showing a modification of the recording head shown in FIG. 11B.

FIG. 12 shows an embodiment which has substantially the same structure as the embodiment shown in FIG. 11A and in which the lead-out directions of the gate electrodes 130 and the cathode electrodes 150 are alternately changed for each cold cathode. With this arrangement, the intensity of light emitted from the fluorescent layer can be made more uniform in comparison with the embodiment shown in FIG. 11B.

FIGS. 13A and 13B are views showing a second modification of the recording head applied to the apparatus of this invention. FIG. 13A is a plan view showing the main portion including the emitter electrode of the recording head and the surrounding portion and FIG. 13B is a cross sectional view of an A portion indicated by a circular mark in FIG. 13A. In the first modification, the cone-shaped emitter electrode is still formed with the 3-dimensional structure, but the recording head in the second modification is formed by the completely plane process.

A process for making the recording head is schematically explained below.

A thin film such as Mo with a thickness of 1000 nm or less is formed on the glass substrate 105. A photoresist is formed on the thin film in a form as shown by the A portion in FIG. 13A by the photolithography technology. Then, the Mo film is selectively etched with the photoresist used as a mask to form an emitter 110. Next, an $SiO_2$ film with a thickness of approximately 1000 nm is formed by a method such as the plasma CVD and a gate electrode 130 is formed on the structure. After this, the photoresist on the emitter 110 is removed by the lift-off technique and a fluorescent layer 160 is formed on a cathode electrode 150. A transparent member such as a glass is mounted on the structure with a space disposed therebetween and a space therebetween is evacuated to complete the recording head.

With the above recording head, when a voltage is applied between the emitter 110 and the gate electrode 130, an electric field which is as intense as approximately $10^7$ V/cm is created near the front end portion of the wedge-shaped emitter 110 and electrons are emitted from the emitter electrode by the field emission. The emitted electrons are accelerated and moved towards the cathode electrode 150 by an electric field created by a voltage applied between the emitter 110 and the gate electrode 130 by a power source 152. The fluorescent layer 160 formed on the cathode electrode 150 emits light when the electrons collide with the fluorescent layer 160 and the light is applied to the photosensitive drum to form an electrostatic latent image on the photosensitive drum. Since all of the parts can be made by use of the plane process in the recording head having the minute cold cathode array, the manufacturing yield can be further enhanced and the manufacturing cost can be further reduced.

Figure 15:
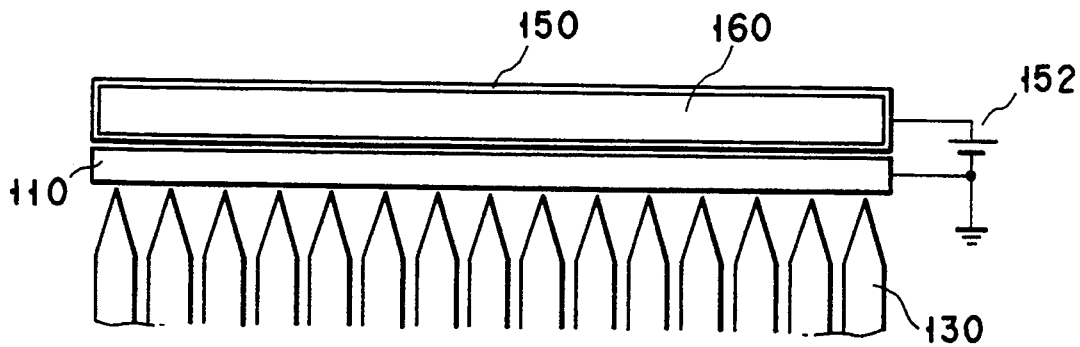
FIG. 15 is a plan view of a fourth modification of the recording head applied to the apparatus of this invention.

FIGS. 14 and 15 show third and fourth modifications of plane patterns of a portion including the emitter 110, gate electrode 130 and the like of the recording head using the minute cold cathode array formed by use of the plane process like the recording head of the second modification. In an example shown in FIG. 14, the front end portion of the gate electrode 130 is formed in a square form and the emitter 110 and the gate electrode 130 are separated from each other by a narrow slit. The width of the slit is approximately several hundred nm, and when a voltage 152 is applied between the above electrodes 110 and 130, an intense electric field is created in the narrow slit, causing the field emission of electrons. Likewise, in the fourth modification of FIG. 15, the front end portion of the gate electrode 130 is formed in a wedge shape and is disposed near the emitter 110. With this structure, the field emission of electrons can be attained by applying an intense electric field between the emitter 110 and the gate electrode 130.

Figure 16:
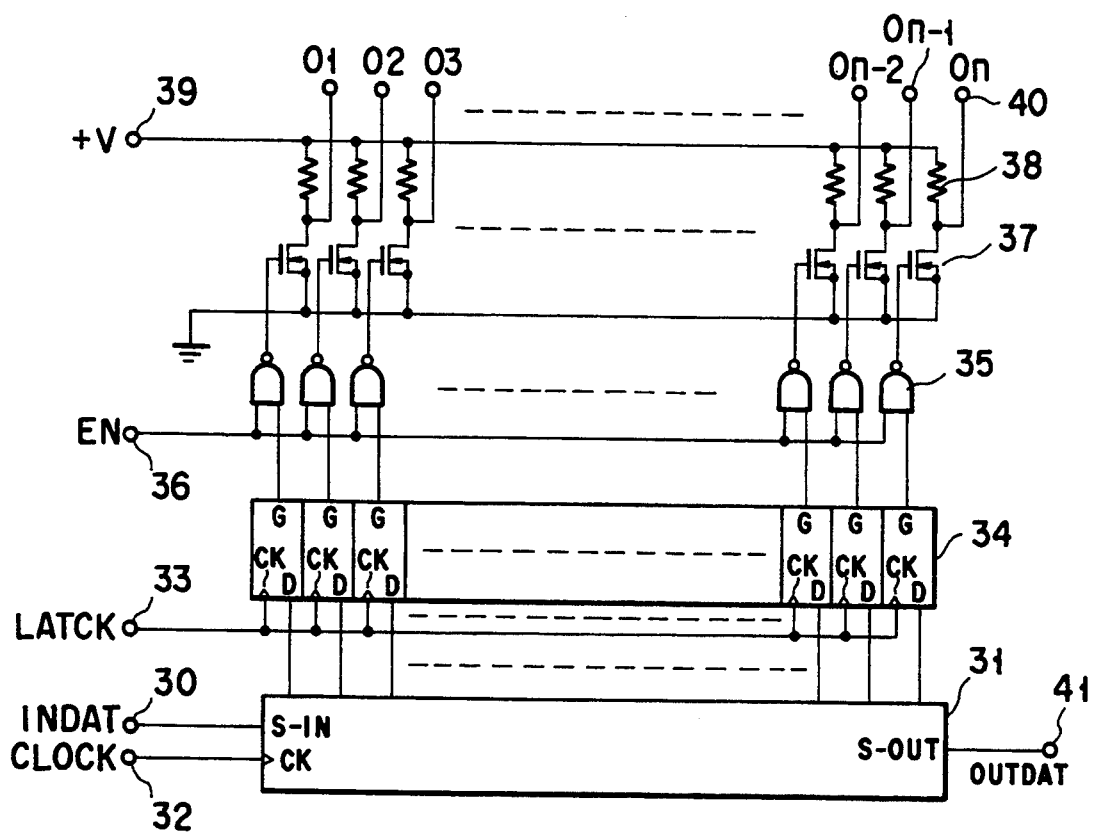
FIG. 16 is a circuit diagram of a driving circuit for driving a recording head of this invention.
Figure 17:
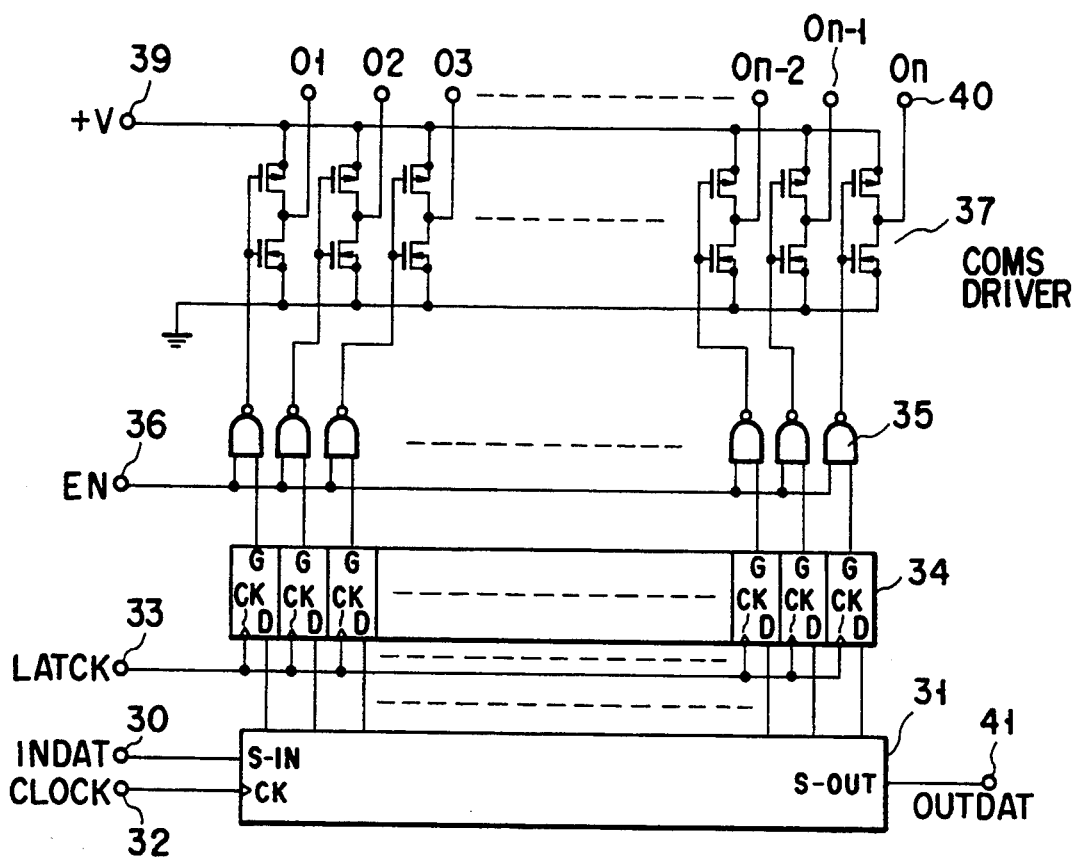
FIG. 17 is a circuit diagram showing a modification of the recording head driving circuit shown in FIG. 16.

Next, a method of driving the minute cold cathode array of this invention is explained. FIGS. 16 and 17 show examples of a digital driving circuit for driving the recording head for an electrophotographic printer using the minute cold cathode array of this invention.

Input image data INDAT 30 is supplied to an input terminal S-IN of a shift register 31. This image data 30 is sequentially shifted in the shift register 31 in response to a data shifting clock 32 supplied to the CK terminal of the shift register 31. The driving circuit is formed in an IC form, and since 64 gate electrodes can be driven, for example, initially input image data 30 is shifted to the front end of the shift register 31 in response to 64 data shifting clocks. By supplying a latch signal LATCH33 at this time, all the data in the shift register 31 is transferred to and held in a latch 34. Outputs from the latch 34 are supplied to one-side input terminals of respective NAND gates 35 which are also supplied with a recording signal EN36 at the other input terminals. Output terminals of the NAND gates 35 are connected to gates of open drain type N-MOS transistors 37.

The sources of the N-MOS transistors 37 are grounded and the drains thereof are connected to a power source 39 via respective load resistors 38. Output terminals 40 ($0_1$ to $0_n$) are led out from the drains of the transistors 37 and are connected to the gate electrodes of the minute cold cathode array. Thus, the driving circuit of the above construction is formed. In this case, an output from the output terminal 40 can be set to 0 V by turning off the transistor 37 and an output from the output terminal 40 can be set to $+V$ by turning on the transistor 37. That is, light emission from the respective cold cathodes can be controlled by controlling the potentials of the gate electrodes for the respective cold cathodes. While the recording signal EN36 is set at the "H" level, the gates of the transistors 37 of only those of the elements which are supplied with an output "H" from the latch 34 are set to the "L" level potential so that the transistors will be turned off and voltages of the power source 39 can be output from the corresponding output terminals 40($0_n$), thereby causing the elements to emit lights.

A data output terminal OUTDAT41 is used when a large number of driver ICs are serially connected and is connected to the input terminal S-IN of the shift register 31 of a next stage driver IC.

The recording density of each pixel can be modulated by modulating the illumination intensity of each minute cold cathode, but the control operation is difficult in the digital IC. Therefore, the recording density of the image dot is modulated by controlling the light energy applied to the photosensitive drum by use of a system for controlling the light emission time of the respective elements. However, as is clearly understood from the circuit of FIG. 16, since the element driving time is controlled by the recording signal EN36 commonly for all of the elements, the light emission time cannot be controlled for each element. Therefore, in a case where one pixel is formed, one element is repeatedly energized for light emission and the light emission time can be controlled by controlling the number of times by which the element is energized for light emission. That is, when data is transferred to the shift register, data "H" is supplied by a large number of times to the element which is required to be energized for light emission for a long period of time and data "H" is supplied by a small number of times to the element which is required to be energized for light emission for a short period of time. Thus, by outputting the recording signal by a large number of times, the light emission time can be controlled for each cold cathode.

FIG. 17 shows an example of a circuit constructed in a case where CMOS inverters 37' are used in the output section. The operation of this circuit is the same as that of the circuit shown in FIG. 16, but since the load resistors 38 are not used in this circuit unlike the circuit of FIG. 16, it is not necessary to pay any attention to the problem of heat generation and the attachment and formation of the resistors.

In the above explanation, the driving circuits shown in FIGS. 16 and 17 are formed in the IC form but are not limited to the IC form driving circuits. For example, in a case where a recording head with a length of A4 size and the high resolution of 400 dpi is used, approximately 500 64-bit driving ICs are necessary. In a case where the recording with the extremely high resolution of 1000 dpi is effected, 100 or more driving ICs are necessary. If a large number of driving ICs are mounted on the recording head, the recording head becomes extremely large.

As a method for solving the above problem, a method for directly forming the circuit shown in FIG. 16 or 17 on the recording head is proposed. For example, in the case of recording with the resolution of 2000 dpi, the pitch of the minute cold cathodes is approximately 12.8 μm and the line width of the gate electrode is 5 to 6 μm. In the case of the high resolution, the gate electrode width get into part of the IC forming area and it is difficult to connect output terminals of the driving ICs to the gate electrodes with such a small pitch by use of the wire bonding technique. Therefore, it becomes possible to form the recording head having the minute cold cathode array with extremely high resolution by forming the entire portion of the recording head including the driving ICs on an Si substrate by use of the IC forming technique. The feature that the driving circuit is formed on the recording head by the IC forming technique is an outstanding feature which is not provided in the conventional recording head.

Figure 18:
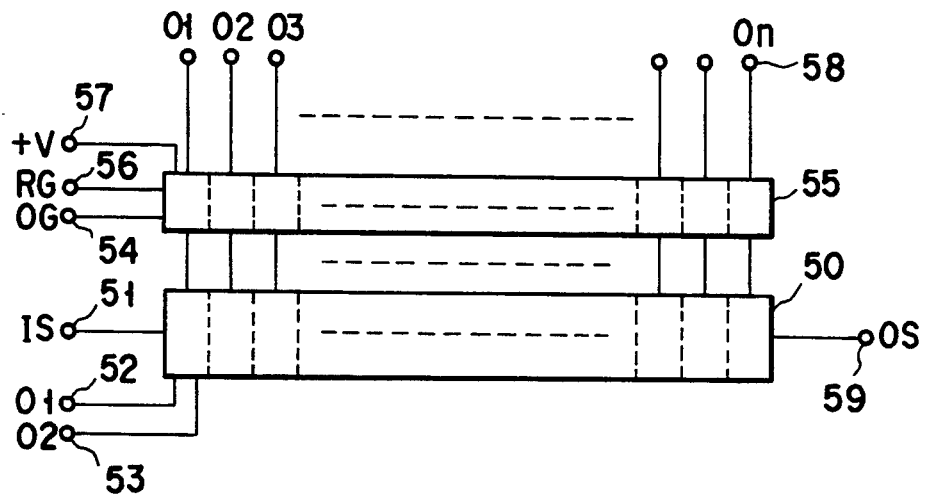
FIG. 18 is a circuit diagram of an analog driving circuit for driving a recording head.

The circuits shown in FIGS. 16 and 17 are digital driving circuits, but FIG. 18 is a circuit diagram showing an analog driving circuit for the recording head.

In the circuit of FIG. 18, an analog shift register 50 is used to sequentially shift image data IS51. Any type of analog shift register can be used as the analog shift register 50, but in this embodiment, it is assumed that the analog shift register 50 of CCD type is used. A general CCD type analog shift register is used in combination with light receiving elements such as photodiodes to construct an image sensor which takes charges induced by light into the CCD analog shift register and shift the charges in the shift register. In this embodiment, a system for shifting charges induced by application of a voltage of the image data IS51 in the CCD analog shift register is provided. A 2-phase driving system using two data shifting clocks $\phi 1(52)$ and $\phi 2(53)$ is used to shift data.

When data shifting in the CCD analog shift register 50 is completed, an output gate control signal OG54 is supplied to an output reception amplifier section 55. The output reception amplifier section 55 has the same construction as the last-stage portion of an ordinary CCD image sensor and is a section for converting the transferred charges into a corresponding voltage and outputting the same. An amplifier section is attached to only the last stage portion in the ordinary CCD image sensor, but in the recording head used in this embodiment, the amplifier section 55 is attached to each of the stages of the CCD analog shift register. The amplifier section 55 is supplied with an output reset signal 56 and a power source voltage 57(+V) in addition to the output gate control signal 54. In a period from the time the output gate control signal 54 is output until the time the reset signal 56 is output, gate electrode control signals are output from output terminals 58.

At this time, voltages which are controlled in a range between 0 and the power source voltage +V in an analog manner are output from the output terminals 58 and are applied to the gates of the respective minute cold cathodes so that the intensity of the light emission of the recording head can be controlled according to the voltages. Therefore, light outputs of the respective elements can be controlled by modulating image data 51 supplied to the input terminal of the CCD in an analog manner. In the above-described digital type driving circuit, since it was difficult to separately control the output voltages of the respective elements, the substantial pulse width control was effected by multiplex recording. For this purpose, it was necessary to form one image dot by repeatedly effecting the data transfer and recording. However, if an analog shift register is used as in this embodiment, the individual elements can be driven in an analog manner and the density of the image dot can be modulated by effecting the data transfer and recording one time.

An output signal 59 is derived from the final stage of the analog shift register. The output signal 59 can be used for signal monitoring or used as an input signal for a next-stage driving IC when driving ICs are used and cascade-connected. As described above, the driving circuit is used not only for the driving IC, a method for forming the driving circuit directly on the substrate can be used in the case of recording with the extremely high resolution.

The above driving circuit is explained to drive the elements in response to an input signal, but an embodiment in which the a field emission type cold cathode array is applied to the recording head of a binary printer by using a control apparatus for individually driving the elements is explained below.

FIG. 19 is a block diagram showing an example of a flow of the process effected by a driving/controlling apparatus of this invention. In the driving/controlling apparatus 1, an image signal is sequentially supplied to a resolution converter 3, binary encoder 4, variation compensator 5 and driver section 6 in this order to form a driving signal supplied to an array-form recording element 7. This invention relates to this portion. An output device 2 for an image signal is a computer, image memory or the like. In this example, the image signal is output after developed into a bit form. In this invention, since no particular feature lies in this portion, the explanation therefore is omitted. As the recording element 7, the recording element described before is used. However, if the recording element having sufficient resolution than that of the transferred image signal is used, the type thereof is not limited.

The apparatus of this embodiment is designed for an apparatus supplied with a binary image signal which is subjected to the bit development.

In this invention, since an image is recorded with a resolution higher than that of an input image signal, the resolution is converted in the main scanning direction and in the sub-scanning direction. In this example, the linear interpolation is used for the resolution conversion and the principle thereof is explained below with reference to FIG. 20.

In FIG. 20, assume the resolution conversion (magnification conversion) from the resolution of an image represented by white circle marks to the resolution of an image represented by black dot marks. A signal value $M(n,m)$ of the black dot mark can be derived as follows based on signal values $D(c, d)$, $D(c+1, d)$, $D(c, d+1)$ and $D(c+1, d+1)$ of the white circle marks surrounding the black dot mark and interpolation coefficients a, a', b and b' in the x and y directions.

$$M(n,m)=b'\cdot(a'\cdot D(c,d)+a\cdot D(c+1,d))+b\cdot(a'\cdot D(c,d+1)+a\cdot D(c+1,d+1)) \quad (1)$$

$$(a'=1-a, b'=1-b)$$

The position PXn (corresponding to c in the equation (1)) in the x direction of an original signal which is referred to for deriving an n-th magnification conversion signal $M(n, *)$ in the x direction (main scanning direction) can be generally expressed by the following equation.

$$PXn = int(rx \cdot n + cx)$$

(rx is the reciprocal of the magnification in the x direction, int is a function for deriving the integer part, and cx is a given constant)

In this case, cx can be freely set according to the phase relation between the original signal and the magnification conversion signal.

The interpolation coefficient KXn (corresponding to a in the equation (1)) can be expressed by the following equation.

$$KXn = frac(rx \cdot n + cx)$$

(frac is a function for deriving a decimal part)

Likewise, the position PYm (corresponding to d in the equation (1)) in the y direction which is referred to for deriving an m-th magnification conversion signal $M(*, m)$ in the y direction (sub-scanning direction) and the interpolation coefficient KYm (corresponding to b in the equation (1)) can be expressed by the following equations.

$$PYm = int(ry \cdot m + cy)$$

(ry is the reciprocal of the magnification in the y direction and cy is a given constant)

$$KYm = frac(ry \cdot m + cy)$$

The magnification conversion signal $M(n, m)$ can be derived by substituting the above equations into the equation (1).

A digital circuit for effecting the above magnification conversion process can be constructed as follows.

In order to create KXn, an adder is cleared (cx=0) by use of Hsync (horizontal synchronization signal), rx is sequentially added in synchronism with a clock for transferring the magnification conversion signal to the next stage, and an overflow portion is neglected. rx is a value obtained by expressing the reciprocal of the specified magnification in a binary form. PXn can be set by generating a clock used for reading out the original signal at adequate timings. That is, two clocks are generated to read out two original signals from a buffer after Hsync, and then, a clock is generated to read out new data from the buffer each time the overflow occurs in the above adder.

In order to create KYm, an adder is cleared (cy=0) by use of Psync (page synchronization signal), ry is sequentially added in synchronism with Hsync, and an overflow portion is neglected. ry is a value obtained by expressing the reciprocal of the specified magnification in a binary form. PYm can be set by writing signals of two to three lines into a buffer by Psync, then writing new data of one line into the buffer and changing the buffer from which data is to be read out each time the overflow occurs in the above addition of rx.

After KXn, PXn, KYm and PYm are determined, the multiplication and addition are effected according to the equation (1).

A circuit image for the above process is shown in FIG. 21.

An image signal is written into a line buffer by means of a controller. The image signal written into the line buffer is read out from the line buffer together with data obtained in a cycle one line before the present cycle and then transferred to a latter stage circuit. The controller controls the operations of writing an image signal of one line and reading out an image signal of two lines.

Two image signals read out from the line buffer are multiplied by the respective interpolation coefficients (KYm and 1−KYm) in the sub-scanning direction output from the controller and then latched by flip-flops. Since the image signals are binary signals and the multiplication is effected simply by multiplying the interpolation coefficient by 0 or 1, it is only necessary to input the interpolation coefficient to the data terminal of the flip-flop, input the image signal to the clear terminal thereof, and latch the same in response to a clock generated by the controller in an actual circuit.

The image signals multiplied by the interpolation coefficients are multiplied by the respective interpolation coefficients (KXn and 1−KXn) in the main scanning direction as well as signals latched in the next-stage flip-flops, and the respective results of multiplication are added together in an adder, latched by a flip-flop which in turn outputs a multivalue image signal having been subjected to the resolution conversion.

As described above, in this embodiment, the resolution of an input signal is converted to the resolution of the recording element. For this reason, even if the resolution of the input signal is different, only parameters given to the controller will become different. Therefore, the recording and magnification conversion of image signals with various resolutions can be effected.

Since, in this embodiment, the recording element is controlled by use of binary data, it is necessary to code an image signal which has been coded into a multivalue form by the resolution conversion into a binary form again. Various binary coding methods are provided, but in this embodiment, the binary coding may be effected by dividing the signal subjected to the resolution conversion into two values by using a threshold value as a reference since it is assumed in this embodiment that the input signal is a character. More specifically, it is only necessary to derive the logical OR of MSB of the signal subjected to the resolution conversion and the bit assigned to the overflow. BY the above resolution conversion and binary coding, the smoothing of the character can be attained. When the recording is effected without smoothing, it is only necessary to use SPC (Selective Process Conversion Nearest Neighboring Approximation) as the resolution conversion instead of the linear interpolation. This method can be attained by keeping the coefficients to satisfy the following equation.

$$KX_n = KY_m = 1$$

When the smoothing is not effected at all, the multiplication and addition of the image signal are not necessary and it is only required to read out data from the line buffer at adequate timings (in the same manner as in the data readout in the linear interpolation).

In this embodiment, the minute cold cathode array using the field emission is used as the recording element, but a problem of variation in the outputs of the elements tends to occur not only when the recording is effected by use of the above elements but also when the recording is effected by use of elements arranged in an array form. The variation compensator provided between the secondary binary encoding section and the driving section sets the variation compensation unit width and effects the compensation for a variation in the outputs according to the number of driven elements in the unit width. More specifically, the compensation is effected as follows.

First, the magnitude of an output (amount of light) for each preset range is determined. Then, the output of each element is measured. In this embodiment, the outputs were measured by use of a CCD line sensor with the resolution of 10 [dpm] in the off-line manner. If the pitch of the elements of the CCD is set as the unit width for compensation, 50 elements are allotted to each unit width since the pitch width of the recording element is set to 2 [μm]. The number of elements used for each unit width is adjusted according to the measurements by the CCD. As a result, the variation can be compensated for with the precision of approximately 2%. The variation compensation characteristic will be changed according to the length of the unit width. With the small unit length, a variation having a short period can be compensated for, but since the number of elements in the unit width is reduced, the precision is lowered. In contrast, when the large unit width is used, the precision is enhanced, but a variation having a short period cannot be compensated for. For this reason, the unit width must be set to an adequate value based on the precision and the period of the variation to be compensated for. A significant compensation effect cannot be expected in the respect of precision unless at least ten elements are allotted to the unit width.

If the elements which are not used are determined, the positions of the elements which are not used are stored in a memory means such as a ROM. The above operations are effected before starting the recording operation. If the recording operation is started, the positions of elements which are not used are sequentially read out from the memory means, and when image signals corresponding to the elements which are not used are transferred, the image signals are forcedly cleared by use of an AND gate or the like. In this embodiment, the position of an element which was not used was read out from the ROM and decoded into a variation compensation signal, and image signal was input to one of the two input terminals of a shift register (SIPO) of the driver section and the compensation signal was input to the other input terminal to derive a logical AND value.

The driver section supplies a driving signal to the recording element according to an image signal which is binary-coded again. This section is basically the same as the driver of a thermal head and the construction thereof is briefly explained here.

The main portion of the driver section includes a shift register, flip-flops and high-withstanding voltage drivers. A binary-coded image signal is input to the shift register and converted from the serial form to the parallel form, and when all of the data is input, the data is latched into the flip-flops. As described before, the compensation is effected in the input section of the shift register by deriving the logical AND with the compensation signal. The flip-flops are designed to be cleared by a RESET signal, Hsync signal, Psync signal. Outputs of the flip-flops are supplied to signal input terminals of the high-withstanding voltage drivers via AND gates which receive a common enable signal and those of the elements which correspond to the ON input signals are driven to form an image.

This invention is not limited to the driving/controlling apparatus for the field emission type minute cold cathode array elements. That is, the system thereof is not limited if a recording head having recording elements arranged with a density higher than the resolution of an image signal to be transferred is used.

Next, an embodiment in which the recording head driving/controlling apparatus is applied to a recording apparatus supplied with a multivalue image signal is explained.

In this embodiment, recording elements having the resolution higher than that of the image signal are used to effect the graduation recording without lowering the resolution of the image signal. The driving elements set in a range corresponding to the physical size of the image signal is controlled according to the value of the image signal. In this example, since the resolution of the image signal is 16 [dpm] and the resolution of the recording elements is 512 [dpm] (approximately 2 [μm] pitch), 32×32 elements are used for recording one image signal.

The schematic construction of an actual circuit is shown in FIG. 22. Image signals are sequentially read out from the line buffer and the values of the readout signals are supplied to an address line of the ROM together with recording positions (0 to 31) in the subscanning direction (in one pixel) to derive 32-bit data. The data is used as driving signals for the 32 recording elements corresponding to the image signal. The multilevel graduation recording can be effected by sequentially transferring the data from the shift register (SIPO) to the driver section which is the same as that of the former embodiment. It is possible to temporarily store data read out from the ROM into a line buffer and then transfer the data. In this case, it becomes possible to transfer the signals to the driver section in a nearly complete parallel form.

Figure 23:
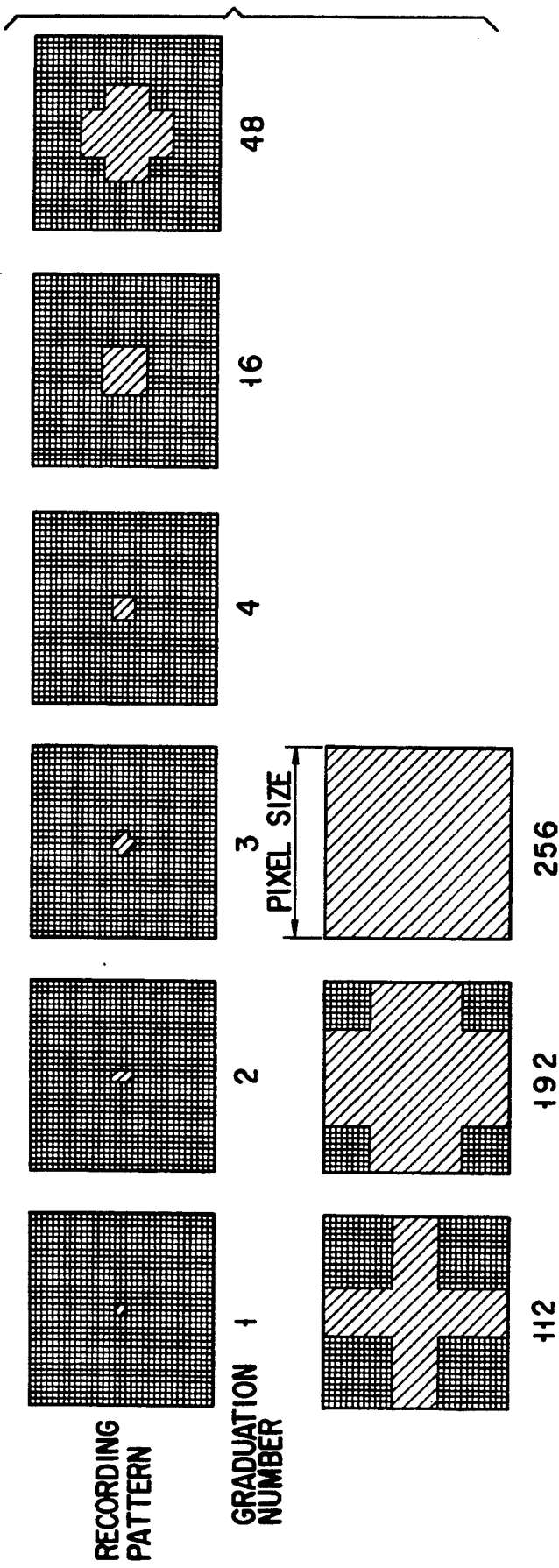
FIG. 23 is a diagram showing an example of a method for driving recording elements in response to a multi-value image signal.

An example of the structure of the driving data of 32×32 of the value of an image signal is shown in FIG. 23. Since the resolution of the recording elements is sufficiently higher than that of the image signal, the structure in which the centroid of the recording pixel can be kept unchanged irrespective of the graduation level can be obtained. When the resolutions of the recording elements and the image signal are equal to each other, the centroid of the recording pixel is changed according to the graduation level, and as a result, the changeover portion of the texture becomes noticeable when an image of smooth graduation is recorded and the changeover portion is observed as a stepped portion of the graduation. Thus, when the structure is made so that the centroid of the recording section can be kept unchanged as in this embodiment, the smooth graduation can be reproduced.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electrophotographic recording apparatus comprising:
   a printing head having a substrate, a plurality of recording elements, a certain number of which are driven on the basis of one image signal, formed on said substrate, each of which includes at least one first electrode for emitting electrons according to a predetermined voltage condition and at least one second electrode disposed to face said first electrode and selectively applied with a voltage which is positive with respect to said first electrode, for causing a selected first electrode to emit electrons, and a light emitting section including an acceleration electrode for accelerating electrons emitted from said first electrode and a fluorescent layer for emitting light from a portion against which the electrons accelerated by said acceleration electrode collide; and
   a photoconductive medium which is uniformly charged and on which an electrostatic image is formed by application of light emitted from said fluorescent layer.

2. An electrophotographic recording apparatus according to claim 1, wherein said recording elements are arranged in a staggered form.

3. An electrophotographic recording apparatus according to claim 1, wherein said acceleration electrode is formed on said substrate to surround said second electrode and said fluorescent layer is formed on said acceleration electrode.

4. An electrophotographic recording apparatus according to claim 1, wherein said acceleration electrode is formed on said substrate, said fluorescent layer is formed on said acceleration electrode, and the contact surface between said acceleration electrode and said fluorescent layer is set in the same plane as said second electrode.

5. An electrophotographic recording apparatus according to claim 4, wherein said recording elements have a plurality of second electrodes disposed to face said first electrode.

6. An electrophotographic recording apparatus according to claim 1, wherein a voltage applied to one of said second electrodes acts to drive a plurality of said first electrodes.

7. An electrophotographic recording apparatus according to claim 1, further comprising a driving circuit formed on said substrate, for selectively applying a driving voltage to said recording elements.

8. An electrophotographic recording apparatus according to claim 1, in which a preset number of said recording elements are allocated to one pixel of an input image signal in order to attain a resolution higher than that of the input image signal; and which further comprises driving means for individually driving said recording elements in one pixel of the input image signal.

9. An electrophotographic recording apparatus according to claim 8, wherein said driving means further includes
   input means for inputting image data,
   latch means for latching the input image data in response to a latch signal, and
   output means for outputting the latched image data by a predetermined timing.

10. An electrophotographic recording apparatus according to claim 9, wherein said input means includes a plurality of shift registers.

11. An electrophotographic recording apparatus according to claim 9, wherein said output means includes
    a plurality of NAND gates for NANDing the latched image data with a recording signal, and
    a plurality of MOS transistors each having a source connected to ground level and a drain connected to a power source via a resistor.

12. An electrophotographic recording apparatus according to claim 9, wherein said output means includes
    a plurality of NAND gates to NANDing the latched image data with a recording signal, and
    a plurality of first MOS transistors each having a source connected to ground level and a drain connected to a power source via respective second transistors.

13. An electrophotographic recording apparatus according to claim 8, wherein said driving means further includes
    a plurality of analog shift registers, which are connected in series and have a first end and a second end, for inputting image data from the first end and sequentially transmitting the image data in themselves, and
    output means for inputting the image data from said plurality of analog shift registers and outputting a voltage corresponding to a strength of the image data.

14. An electrophotographic recording apparatus according to claim 13, wherein said plurality of analog shift registers are made of CCD analog shift registers.

15. An electrophotographic recording apparatus according to claim 13, wherein said second end has an output terminal.

16. An electrophotographic recording apparatus according to claim 8, wherein said driving means is formed on said printing head.

17. An electrophotographic recording apparatus according to claim 1, in which a preset number of said recording elements are allocated to one pixel of an input image signal in order to attain a resolution higher than that of the input image signal and which further comprises graduation recording means for effecting a graduation recording with the resolution higher than that of the input image signal.

18. An electrophotographic recording apparatus according to claim 17, wherein said graduation recording means is formed on said printing head.

19. An electrophotographic recording apparatus according to claim 1, in which a preset number of said recording elements are allocated to one pixel of an input image signal in order to attain a resolution higher than that of the input image signal; and which further comprises voltage applying means for applying a voltage only to a preset number of recording elements among said plurality of recording elements corresponding to one pixel of the input image signal at the recording time.

20. An electrophotographic recording apparatus according to claim 19, wherein said voltage applying means is formed on said printing head.

* * * * *